US009465140B2

(12) United States Patent
Crawford et al.

(10) Patent No.: US 9,465,140 B2
(45) Date of Patent: Oct. 11, 2016

(54) PETROPHYSICAL METHOD FOR PREDICTING SHEAR STRENGTH ANISOTROPY IN FINE-GRAINED ROCK FORMATIONS

(71) Applicants: Brian Ronald Crawford, Missouri City, TX (US); Nora Lee DeDontney, Houston, TX (US); Bashar Alramahi, Houston, TX (US); Steinar Ottesen, Katy, TX (US)

(72) Inventors: Brian Ronald Crawford, Missouri City, TX (US); Nora Lee DeDontney, Houston, TX (US); Bashar Alramahi, Houston, TX (US); Steinar Ottesen, Katy, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 568 days.

(21) Appl. No.: 13/918,468

(22) Filed: Jun. 14, 2013

(65) Prior Publication Data
US 2013/0346048 A1 Dec. 26, 2013

Related U.S. Application Data

(60) Provisional application No. 61/777,977, filed on Mar. 12, 2013, provisional application No. 61/663,368, filed on Jun. 22, 2012.

(51) Int. Cl.
*G06G 7/48* (2006.01)
*G01V 99/00* (2009.01)

(52) U.S. Cl.
CPC ....... *G01V 99/005* (2013.01); *G01V 2210/626* (2013.01); *G01V 2210/6242* (2013.01)

(58) Field of Classification Search
CPC .............. G01V 99/005; G01V 99/00; G01V 2210/6242; G01V 2210/626
USPC ................................................. 703/10; 702/6
See application file for complete search history.

(56) References Cited

U.S. PATENT DOCUMENTS

| 3,809,430 | A | * | 5/1974 | Michaelson | ............ | E21C 41/26 299/5 |
|---|---|---|---|---|---|---|
| 5,767,399 | A | | 6/1998 | Smith et al. | | |
| 5,794,720 | A | | 8/1998 | Smith et al. | | |
| 6,109,368 | A | | 8/2000 | Goldman et al. | | |
| 6,131,673 | A | | 10/2000 | Goldman et al. | | |

(Continued)

FOREIGN PATENT DOCUMENTS

| WO | WO 2011/056356 | 10/2011 |
|---|---|---|
| WO | WO 2011/056358 | 10/2011 |

OTHER PUBLICATIONS

Duveau et al. "A Modified Single Plane of Weakness Theory of the Failure of Highly Stratified Rocks". 1998 Elsevier Science Ltd. INt. J. Rock Mech. Min. Sci. vol. 35, No. 6, pp. 807-813.*

(Continued)

*Primary Examiner* — Eunhee Kim
(74) *Attorney, Agent, or Firm* — ExxonMobil Upstream Research Company, Law Department

(57) ABSTRACT

Method and system is described for modeling one or more geophysical properties of a subsurface volume. In one example, a method for predicting strength anisotropy in subsurface formations along a wellpath comprises receiving a stress model of the subsurface formation in the area of the wellpath. Bulk strength properties of target rock are obtained and used to develop anisotropic failure criteria. The stress model may then be combined with the anisotropic failure criteria to develop an anisotropic wellbore stability model which is used to enhance hydrocarbon recovery.

11 Claims, 11 Drawing Sheets

(56) References Cited

U.S. PATENT DOCUMENTS

| | | | |
|---|---|---|---|
| 6,374,926 | B1 | 4/2002 | Goldman et al. |
| 6,408,953 | B1 | 6/2002 | Goldman et al. |
| 6,612,382 | B2 | 9/2003 | King et al. |
| 7,032,689 | B2 | 4/2006 | Goldman et al. |
| 7,035,778 | B2 | 4/2006 | Goldman et al. |
| 7,085,696 | B2 | 8/2006 | King et al. |
| 7,261,167 | B2 | 8/2007 | Goldman et al. |
| 7,357,196 | B2 | 4/2008 | Goldman et al. |
| 7,472,022 | B2 | 12/2008 | Birchwood |
| 7,526,385 | B2 | 4/2009 | Sayers |
| 7,676,353 | B2 * | 3/2010 | Bradford ............... E21B 47/026 702/11 |
| 2009/0006058 | A1 | 1/2009 | King |
| 2009/0187391 | A1 | 7/2009 | Wendt et al. |
| 2010/0020642 | A1 * | 1/2010 | Sinha ...................... G01V 1/44 367/75 |
| 2010/0312534 | A1 * | 12/2010 | Xu .......................... G01V 1/50 703/2 |
| 2011/0015907 | A1 | 1/2011 | Crawford et al. |
| 2013/0138409 | A1 | 5/2013 | Lee et al. |
| 2013/0140020 | A1 * | 6/2013 | Suarez-Rivera ........ E21B 43/26 166/250.1 |
| 2015/0168597 | A1 * | 6/2015 | Bai ......................... G01V 99/00 703/10 |

OTHER PUBLICATIONS

Aadnoy, B., et al., (2009) Borehole failure related to bedding plane. In *Proceedings 43rd US Rock Mechanics Symposium*, Asheville, Jun. 28-Jul. 1, 2009.

Ajalloeian, R., et al., (2000) Strength anisotropies in mudrocks. *Bull. Eng. Geol. Env.* 59: 195-199.

Amadei, B. (1996) Importance of anisotropy when estimating and measuring in situ stress in rock. *Int. J. Rock Mech. & Min. Sci.* 33(3): 293-325.

Attewell, P.B., et al., (1974) Intrinsic shear strength of a brittle, anisotropic rock—I, Experimental and mechanical interpretation. *Int. J. Rock Mech. Min. Sci.* 11: 423-430.

Attewell, P.B., et al., (1976) *Principles of Engineering Geology*. 1st ed. London: Chapman & Hall.

Brehm, A., et al., (2006) Optimizing a deepwater susbsalt drilling program by evaluating anisotropic rock strength effects on wellbore stability and near-wellbore stress effects on the fracture gradient. In *Proceedings of the IADC/SPE Drilling Conference*, Miami, Feb. 21-23, 2006.

Chang, C., et al. (2006) Empirical relations between rock strength and physical properties in sedimentary rocks. J. Pet. Sci. & Eng. 51: 223-237.

Chenevert, M.E., et al., (1965) Mechanical anisotropies of laminated sedimentary rocks. *Soc. Petrol. Eng. J.* 5: 67-77.

Cho, J.W., et al., (2011) An experimental study on deformation and strength anisotropy of transversely isotropic rocks in Korea. In *Proceedings of the 12th International Congress on Rock Mechanics*, Beijing, Oct. 18-21, 2011.

Cholach, P.Y. et al., (2003) Intrinsic anisotropy of shales. In *Proceedings of the Annual Meeting of the Society of Exploration Geophysicists*, Dallas, Oct. 26-31, 2003.

Cooke, M.L., et al., (1997) Bedding-plane slip in initial stages of fault-related folding. 1997. *J. Struct. Geol.* 19(3-4): 567-581.

Coulomb, C.A. (1773) Application of the rules of maxima and minima to some problems of statics related to architecture. Acad. Roy. Sci. Mem. Math. Phys. 7: 343-382.

Crawford, B.R., et al., (2010) Petrophysical methodology for predicting compressive strength in siliciclastic "sandstone-to-shale" rocks. In *Proceedings of the 44th US Rock Mechanics Symposium*, Salt Lake City, Jun. 27-30, 2010.

Crook, J.L., et al., (2002) Development of an orthotropic 3D elastoplastic material model for shale. In *Proceedings of the SPE/ISRM Rock Mechanics Conference*, Irving, Oct. 20-23, 2002.

Donath, F.A. (1964) Strength variations and deformational behavior in anisotropic rock. In *State of Stress in the Earth's Crust*, ed. W.R. Judd, 281-297.

Ewy, R.T., et al., (2010) Strength anisotropy of mudstones and shales. In *Proceedings of the 44th US Rock Mechanics Symposium*, Salt Lake City, Jun. 27-30, 2010.

Gazaniol, D., et al., (1995) Wellbore failure mechanisms in shales: Prediction and prevention. *J. Pet. Tech.* Jul. 1995: 589-595.

Jaeger, J.C. (1960) Shear failure of anisotropic rocks. *Geol. Mag.* 97: 65-72.

Kaarsberg, E.A. (1959) Introductory studies of natural and artificial argillaceous aggregates by sound-propagation and X-ray diffraction methods. *J. Geol.* 67: 447-472.

Lashkaripour, G. R., et al., (1993) A statistical study on shale properties: relationship among principal shale properties. In Proceedings of the Conference on Probabilistic Methods in Geotechnical Engineering, Canberra, Feb. 10-12.

Leung, P.K. et al. (1992) Dielectric constant measurements: a new, rapid method to characterize shale at the wellsite. Proceedings of the IADC/SPE Drilling Conference, New Orleans, Feb. 18-21, 1992.

McLamore, R.T., et al., (1967) A strength criterion for anisotropic rocks based upon experimental observations. In *Proceedings of the Annual Meeting of the American Institute of Mining, Metallurgical and Petroleum Engineers*, Los Angeles, Feb. 19-23, 1967.

Ottesen, S., et al., (1999) Borehole stability assessment using quantitative risk analysis. In *Proceedings of the IADC/SPE Drilling Conference*, Amsterdam, Mar. 9-11, 1999.

Pariseau, W.G. (1968) Plasticity theory for anisotropic rocks and soil. In *Proceedings 10th US Symposium on Rock Mechanics*, Austin, May 20-22, 1968.

Ramamurthy, T., et al., (1988) A strength criterion for anisotropic rocks. In *Proceedings of the 5th Australia-New Zealand Conference on Geomechanics*, Sydney, I: 253-257.

Ramamurthy, T. (1993) Strength and modulus response of anisotropic rocks. In *Comprehensive Rock Engineering* vol. I, ed. J. Hudson, 313-329.

Santarelli, F.J. (1994) Similarities and differences between wellbore stability and sand production. In North Sea Oil and Gas Reservoirs—III, Nov. 30-Dec. 2, eds. Aasen, J.O., E. Berg, A.T. Buller, O. Hjelmeland, R.M. Holt, J. Kleppe and O. Torsæter, 331-338. Dordrecht: Kluwer.

Schoenberg, M., et al., (1996) Introducing ANNIE: a simple three-parameter anisotropic velocity model for shales. *J. Seis. Expl.* 5: 35-49.

Steiger, R.P. et al. (1992) Quantitative determination of the mechanical properties of shales. SPE Drilling & Completion, 7: 181-185.

Willson, S.M., et al., (1999) Drilling in South America: A wellbore stability approach for complex geologic conditions. 1999. In *Proceedings of the SPE Latin American and Caribbean Petroleum Engineering Conference*, Caracas, Apr. 21-23, 1999.

* cited by examiner

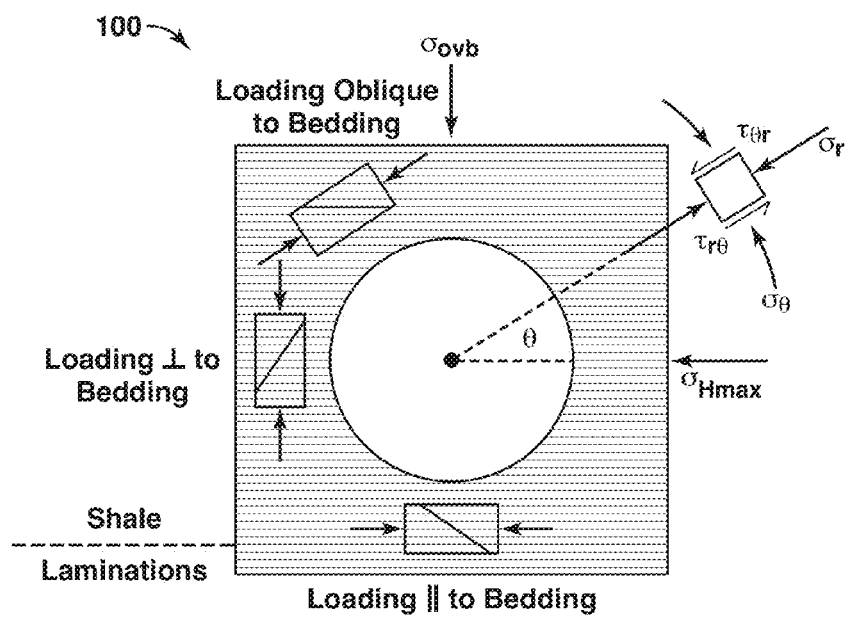
FIG. 1
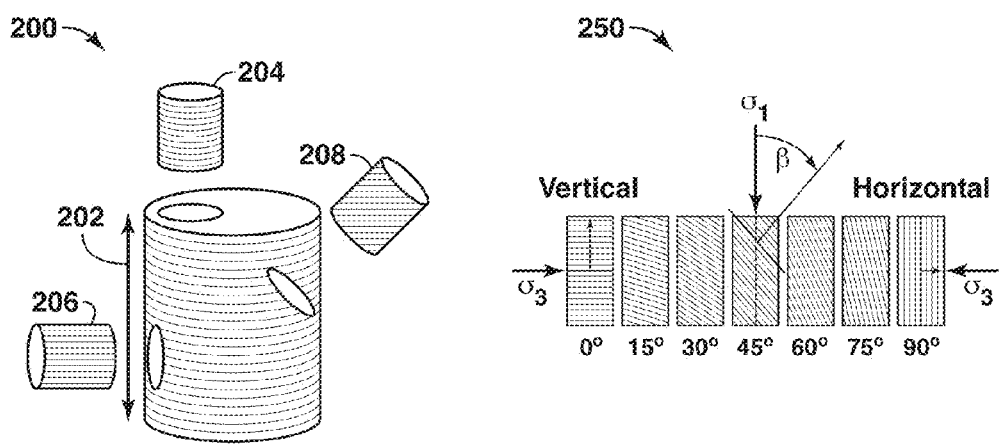
FIG. 2A
FIG. 2B

PETROPHYSICAL METHOD FOR PREDICTING SHEAR STRENGTH ANISOTROPY IN FINE-GRAINED ROCK FORMATIONS

CROSS-REFERENCE TO RELATED APPLICATION

This application claims the benefit of U.S. Provisional Patent Application 61/777,977, filed Mar. 12, 2013, entitled PETROPHYSICAL METHOD FOR PREDICTING SHEAR STRENGTH ANISOTROPY IN FINE-GRAINED ROCK FORMATIONS, and 61/663,368, filed Jun. 22, 2012, entitled PETROPHYSICAL METHOD FOR PREDICTING SHEAR STRENGTH ANISOTROPY IN FINE-GRAINED ROCK FORMATIONS, the entirety of each are incorporated by reference herein.

FIELD OF THE INVENTION

This invention relates generally to the field of prospecting and more particularly to data processing. Specifically, the invention is a method for modeling subsurface volumes for one or more geophysical properties. The present invention relates generally to the field of hydrocarbon production, and more particularly to the effect of anisotropic formation strength on the drilling of a stable wellbore along a given locus. As a specific example, the present techniques involve a petrophysical method for utilizing geophysical wireline logs to predict the shear strength anisotropy of sub-surface fine-grained rock formations (particularly shales) without having to core and plug the sub-surface formation of interest to directly measure shear strength anisotropy in the laboratory. Predicted anisotropic strength functions are subsequently used in numerical models of the subsurface, including analytical and computational methods for optimizing mud weight design in high-angle/horizontal extended reach wells in which inclinations can approach bed-parallel.

BACKGROUND

In the oil and gas industry, modeling of the subsurface is typically utilized for visualization and to assist with analyzing the subsurface volume for potential locations for hydrocarbon resources. Accordingly, various methods exist for estimating the geophysical properties of the subsurface volume (e.g., information in the model domain) by analyzing the measurements from measurement equipment (e.g., information in the data domain). The measurements include some information of the geophysical properties that may be utilized to generate the subsurface model.

The interpretation of the subsurface volume may be complicated by the rock properties within the subsurface. In particular, interest in the anisotropic strength characteristics exhibited by fine-grained rock formations has resulted primarily from a desire to understand wellbore failure mechanisms associated with drilling through shales. Although elastic anisotropy in shales can impact wellbore failure through the redistribution of borehole stresses, analytical studies have shown that strength anisotropy has a more significant control. See e.g., Gazaniol, D., T. Forsans, M. J. F. Boisson and J.-M. Piau. 1995. Wellbore failure mechanisms in shales: Prediction and prevention. J. Pet. Tech. July 1995: 589-595.

This effect is particularly pronounced for extended reach drilling (ERD) where the borehole trajectory can achieve near-parallelism with weak bedding planes, as shown in FIG. 1. If the attack angle is low (e.g., approximately 70 to 90° borehole inclination through a formation with approximately (≈) 0° dip angle) interaction between the borehole hoop stress ($\sigma_\theta$ in FIG. 1) and the anisotropic formation can result in oblique loading of the relatively weak bedding laminations leading to premature shear failure. This failure mechanism is often attributed to the invasion of drilling fluids into micro-fractures along bedding planes, which is not necessarily the cause. See, e.g., Ottesen, S. 2010. Wellbore stability in fractured rock. In Proceedings of the IADC/SPE Drilling Conference, New Orleans, 2-4 Feb. 2010. Depending on the relative magnitudes of anisotropic rock strength and borehole stress concentration, breakouts may occur at unexpected positions around the borehole different from the more typical elliptical elongation conventionally found in isotropic rock. See, e.g., Willson, S. M., S. T. Edwards, A. Crook, A. Bere, D. Moos, P. Peska and N. Last. 2007. Assuring stability in extended-reach wells—Analyses, practices and mitigations. In Proceedings of the IADC/SPE Drilling Conference, Amsterdam, 20-22 Feb. 2007.

For optimally orientated positions around the borehole circumference, failure may occur via oblique loading of the planes of weakness (intra-laminar failure) before failure can occur within the bulk material cutting through the planes of weakness (trans-laminar failure), necessitating higher mud weights to reduce stress concentration on weak bedding planes, or else limiting wellbore inclination.

As the recovery of natural resources, such as hydrocarbons rely, in part, on a subsurface model, a need exists to enhance subsurface models of one or more geophysical properties. In particular, a technique for predicting the degree of shear strength anisotropy encountered in fine-grained rock formations (including shales) without recourse to costly and time consuming laboratory measurements is needed. The technique may preferably be suited for utilizing geophysical wireline logs as input data to the predictive technique for evaluating strength anisotropy. The technique calculates a lithology-dependent anisotropic failure criterion that can subsequently be input into analytical or computational methods for optimizing mud weight design in ERD wells. See, e.g., Ottesen, S., R. H. Zheng and R. C. McCann. 1999. Borehole stability assessment using quantitative risk analysis. In Proceedings of the IADC/SPE Drilling Conference, Amsterdam, 9-11 Mar. 1999 and Pande, G. N., G. Beer and J. R. Williams. 1990. Numerical Methods In Rock Mechanics. John Wiley & Sons, NY.

SUMMARY

In one embodiment, a method for predicting strength anisotropy in subsurface formations along a wellpath comprising: receiving a stress model of the subsurface formation in the area of the wellpath; obtaining bulk strength properties of target rock; developing anisotropic failure criteria based on the bulk strength properties; combining the stress model with the anisotropic failure criteria to develop an anisotropic wellbore stability model; and using the anisotropic wellbore stability model to enhance hydrocarbon recovery.

In yet another embodiment, a method for predicting strength anisotropy in subsurface formations is described. The method comprises: compiling a database of core-based strength measurements over a range of orientations and confining pressures for a plurality of fine-grained rock formations; utilizing an automated surface fitting procedure to determine a common anisotropic failure criterion for all database rocks; developing predictive algorithms relating anisotropy parameters in failure criterion and equivalent bulk strength properties; generating subsurface bulk strength properties in strata of interest; utilizing the predictive algorithms and subsurface bulk strength properties to calculate equivalent anisotropic strength properties in subsurface strata of interest; and utilizing predicted anisotropic rock strength for subsurface strata of interest in numerical models of the subsurface.

In still yet another embodiment, a system associated with the drilling of a wellbore is described. The system comprises: a processor; memory coupled to the processor; an application stored in the memory and configured to: compile a database of core-based strength measurements over a range of orientations and confining pressures for a plurality of fine-grained rock formations; utilize an automated surface fitting procedure to determine a common anisotropic failure criterion for all database rocks; develop predictive algorithms relating anisotropy parameters in failure criterion and equivalent bulk strength properties; generate subsurface bulk strength properties in strata of interest; utilize the predictive algorithms and subsurface bulk strength properties to calculate equivalent anisotropic strength properties in subsurface strata of interest; utilize predicted anisotropic rock strength for subsurface strata of interest in numerical models of the subsurface to develop an anisotropic wellbore stability model; and a monitor coupled to the processor and configured to present aspects of the anisotropic wellbore stability model.

In one or more embodiments, the method or system may include various enhancements. For example, observed anisotropic strength values may be determined based on the database of core-based strength measurements; predicted strength values may be determined based on the predictive algorithms; and statistical tools may be used to evaluate a goodness of fit between the observed anisotropic strength values and the predicted strength values; and/or the predictive algorithms may be modified based on the goodness of fit. Further, a database of core-based strength measurements may be modified based on the goodness of fit.

BRIEF DESCRIPTION OF THE DRAWINGS

The foregoing and other advantages of the present disclosure may become apparent upon reviewing the following detailed description and drawings of non-limiting examples of embodiments.

FIG. 1 is a schematic illustration of the interaction between near-wellbore stresses and weak shale lamination planes in a horizontal wellbore.

FIGS. 2A and 2B are orientated core plugs utilized for direct measurement of elastic anisotropy and strength anisotropy.

DETAILED DESCRIPTION

Figure 3:
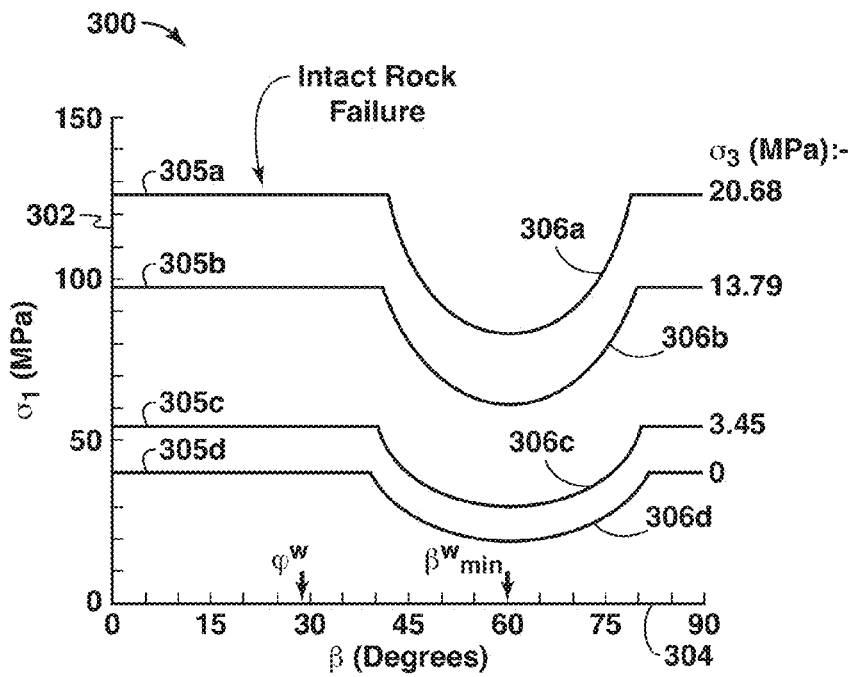
FIG. 3 is a graph of an exemplary single plane of weakness (SPW) model illustrating variation of the maximum principal stress as a function of orientation angle.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent. Further, various terms and reference characters that are the same are utilized in the equations and associated description within the disclosure.

The present disclosure describes methods and systems to enhance subsurface models. The present techniques relates generally to the field of hydrocarbon production, and more particularly to the effect of anisotropic formation strength on the drilling of a stable wellbore along a given locus. To enhance these production operations, a petrophysical method may be based on geophysical wireline logs to predict the shear strength anisotropy of sub-surface fine-grained rock formations (e.g., shales) without having to core and plug the sub-surface formation of interest to directly measure shear strength anisotropy in the laboratory. Then, the predicted anisotropic strength functions are used in numerical models of the subsurface, including analytical and computational methods for optimizing mud weight design in high-angle/horizontal extended reach wells in which inclinations approach may be bed-parallel.

In conventional techniques, the direct measurement of anisotropy may be performed using core samples. Knowledge of shale anisotropy has been significantly advanced by the geophysics community through the analysis of seismic wave propagation (e.g., incorporating anisotropy into migration algorithms to provide for proper positioning of reflectors, [6]) such that the majority of experimental and theoretical investigations have focused on determining elastic anisotropy in shale formations. See, e.g., Cholach, P. Y. and D. R. Schmitt 2003. Intrinsic anisotropy of shales. In Proceedings of the Annual Meeting of the Society of Exploration Geophysicists, Dallas, 26-31 Oct. 2003 and Sondergeld, C. H. and C. S. Rai. 2011. Elastic anisotropy of shale. The Leading Edge March 2011. By comparison with this relatively advanced understanding of elastic anisotropy, research into shale strength anisotropy has received much less attention. This observation may partly reflect the fact that many more test samples are required to quantify strength as opposed to elastic anisotropy, which is discussed further below. Nevertheless, numerous experimental studies have sought to investigate anisotropic strength of rocks with strong planar geologic fabrics including: slate; schist and gneiss; shale and mudstone; siltstone; sandstone; limestone; and coal. See, e.g., McLamore, R. T. and K. E. Gray. 1967. A strength criterion for anisotropic rocks based upon experimental observations. In Proceedings of the Annual Meeting of the American Institute of Mining, Metallurgical and Petroleum Engineers, Los Angeles, 19-23 Feb. 1967; Donath, F. A. 1964. Strength variations and deformational behavior in anisotropic rock. In State of Stress in the Earth's Crust, ed. W. R. Judd, 281-297; Attewell, P. B. and M. R. Sandford. 1974. Intrinsic shear strength of a brittle, anisotropic rock—I, Experimental and mechanical interpretation. Int. J. Rock Mech. Min. Sci. 11: 423-430; Cho, J.-W., H. Kim, K.-B. Min and S. Jeon. 2011. An experimental study on deformation and strength anisotropy of transversely isotropic rocks in Korea. In Proceedings of the 12th International Congress on Rock Mechanics, Beijing, 18-21 Oct. 2011; Nasseri, M. H. B., K. S. Rao and T. Ramamurthy. 2003. Anisotropic strength and deformational behavior of Himalayan schists. Int. J. Rock Mech. Min. Sci. 40(1): 3-23; Shea, W. T. and A. K. Kronenberg. 1993. Strength and anisotropy of foliated rocks with varied mica contents. J. Struct. Geol. 15(9): 1097-1121; Niandou, H., J. F. Shao, J. P. Henry and D. Fourmaintraux. 1997. Laboratory investigation of the mechanical behavior of Tournemire shale. Int. J. Rock Mech. Min. Sci. 34(1): 3-16; Chenevert, M. E. and C. Gatlin. 1965. Mechanical anisotropies of laminated sedimentary rocks. Soc. Petrol. Eng. J. 5: 67-77; Ibanez, W. D. and A. K. Kronenberg. 1993. Experimental deformation of shale: Mechanical properties and microstructural indicators of mechanisms. Int. J. Rock Mech. Min. Sci. & Geomech. Abstr. 30(7): 723-734; Ajalloeian, R. and G. R. Lashkaripour. 2000. Strength anisotropies in mudrocks. Bull. Eng. Geol. Env. 59: 195-199; Attewell, P. B. and I. W. Farmer. 1976. Principles of Engineering Geology. 1st ed. London: Chapman & Hall; Whittles, D. N., E. Yasar, D. J. Reddish and P. W. Lloyd. 2002. Anisotropic strength and stiffness properties of some UK Coal Measure siltstones. Q. J. Eng. Geol. Hydro. 35: 155-166; McGill, G. E. and J. A. Raney. 1970. Experimental study of faulting in an anisotropic, inhomogeneous dolomitic limestone. Geol. Soc. America Bull. 81: 2949-2958; and Pomeroy, C. D., D. W. Hobbs and A. Mahmoud. 1971. The effect of weakness-plane orientation on the fracture of Barnsley Hards by triaxial compression. Int. J. Rock Mech. Min. Sci. 8: 227-238.

Conventional techniques for quantifying both elastic and strength anisotropy involve direct measurement of mechanical properties utilizing orientated core samples. The directional character of the deformational properties of anisotropic media is commonly analyzed in terms of the theory of elasticity using the 3D generalized form of Hooke's law. Expressed via the compliance matrix, the rock then has twenty-one independent elastic constants. See, e.g., Jaeger, J. C., N. G. W. Cook and R. W. Zimmerman. Fundamentals of Rock Mechanics. 4th Edn. Blackwell Publishing Ltd, MA. However, for most practical cases, anisotropic rocks are usually modeled as transversely isotropic media, implying that at each point in the rock there is an axis of rotational symmetry and that the rock has isotropic properties in the plane normal to that axis, in which case only five independent elastic constants are required to fully describe elastic deformability. As shown in diagram 200 of FIG. 2A, one conventional approach for experimental characterization of transverse isotropy is to assume a symmetry axis 202, extract orientated plugs in vertical orientation (e.g., vertical plug 204 having an orientation angle of $\beta=0°$), horizontal orientation (e.g., horizontal plug 206 having an orientation angle of $\beta=90°$) and mid-angle orientation (e.g., mid-angle plug 208 having an orientation angle of $\beta=45°$) and directly measure either the axial and longitudinal strains or the corresponding acoustic velocities associated with these three orientations. See, e.g., Thomsen, L. 1986. Weak elastic anisotropy. Geophysics 51(10): 1954-1966 and Amadei, B. 1996. Importance of anisotropy when estimating and measuring in situ stress in rock. Int. J. Rock Mech. & Min. Sci. 33(3): 293-325. This orientated core plug for direct measurement of elastic anisotropy is shown in diagram 200 of FIG. 2A, While plasticity (e.g., deformation beyond the limit of purely elastic strain), theories for anisotropic geologic materials have also been explored, but by comparison with elastic anisotropy it is less clear how such theories should be utilized to define rational material properties testing procedures. See e.g., Pariseau, W. G. 1968. Plasticity theory for anisotropic rocks and soil. In Proceedings 10th US Symposium on Rock Mechanics, Austin, 20-22 May 1968. As shown in the diagram 250 of FIG. 2B, experimental studies designed to quantify continuous variation in strength with orientation angle ($\beta$) (defined as the angle between the normal to the planar layering and the direction of maximum compressive stress $\sigma_1$) typically utilized plugs cored in 15° increments from the vertical (e.g., orientation angle of β=0°) to the horizontal (e.g., orientation angle of β=90°) direction such that a total of seven orientated core plugs (e.g., having angle of orientations of 0°, 15°, 30°, 45°, 60°, 75° and 90°) are utilized for each lithology. As multiple additional plugs are also necessary for each orientation angle to determine strengthening associated with elevated confining pressure $\sigma_3$, it is apparent that complete characterization of strength anisotropy can involve an order of magnitude more core tests than equivalent characterization of elastic anisotropy.

Geographically-diverse examples of anisotropic rock strength models derived from direct core measurement being used to optimize drilling programs include: Gulf of Mexico; Canada; Venezuela and Colombia; UK continental shelf; and the Middle East. See, e.g., Brehm, A., C. Ward, D. Bradford and G. Riddle. 2006. Optimizing a deepwater subsalt drilling program by evaluating anisotropic rock strength effects on wellbore stability and near-wellbore stress effects on the fracture gradient. In Proceedings of the IADC/SPE Drilling Conference, Miami, 21-23 Feb. 2006; Lang, J., S. Li and J. Zhang. 2011. Wellbore stability modeling and real-time surveillance for deepwater drilling to weak bedding planes and depleted reservoirs. In Proceedings of the IADC/SPE Drilling Conference, Amsterdam, 1-3 Mar. 2011; Gallant, C., J. Zhang, C. A. Wolfe, J. Freeman, T. Al-Bazali and M. Reese. 2007. Wellbore stability considerations for drilling high-angle wells through finely laminated shale: A case study from Terra Nova. In Proceedings of the SPE Annual Technical Conference, Anaheim, 20-22 Nov. 2007; Aadnoy, B., G. Hareland, A. Kustamsi, T. de Freitas and J. Hayes. 2009. Borehole failure related to bedding plane. In Proceedings 43rd US Rock Mechanics Symposium, Asheville, 28 Jun.-1 Jul. 2009; Willson, S. M., N. C. Last, M. D. Zoback and D. Moos. 1999. Drilling in South America: A wellbore stability approach for complex geologic conditions. 1999. In Proceedings of the SPE Latin American and Caribbean Petroleum Engineering Conference, Caracas, 21-23 Apr. 1999; Narayanasamy, R., D. Barr and A. Milne. 2010. Wellbore-instability predictions within the Cretaceous mudstones, Clair field, west of Shetlands. SPE Drilling & Completion December 2010: 518-529; and Grini, M., S. Ottesen, H. S. Al Junaibi, J. Jorden, D. A. Boyd, W. Martin, B. Crawford, B. Alramahi and S. Gosavi. 2012. Extended reach drilling optimization in layer A shale through geomechanical characterization. In Proceedings of the SPE Abu Dhabi International Petroleum Exhibition & Conference, Abu Dhabi, 11-14 Nov. 2012.

In addition to the costly and time consuming nature of deriving shale strength anisotropy from direct core measurement, another distinct disadvantage relates to the potential for inducing damage in such low permeability, fine-grained rocks due to rapid exhumation of core from great depth to the surface. See, e.g., Holt, R. M. 1994. Effects of coring on petrophysical measurements. In Proceedings of the Society of Core Analysts Annual Technical Conference, Stavangar, 1994. The associated permanent microstructural alteration (resulting from diverse mechanisms including in situ stress and pore pressure release, temperature reduction, desiccation, exposure to non-native drilling fluids and poor handling and preservation techniques) can lead to spurious measurement of shale strength anisotropy unrepresentative of that associated with subsurface conditions. See, e.g., Santarelli, F. J. 1994. Similarities and differences between wellbore stability and sand production. In North Sea Oil and Gas Reservoirs—III, 30 November-2 December, eds. Aasen, J. O., E. Berg, A. T. Buller, O. Hjelmeland, R. M. Holt, J. Kleppe and O. Torsxter, 331-338. Dordrecht: Kluwer.

Experimentally determined strength data, $\sigma_1 = f(\sigma_3, \beta)$, may then be used to calibrate various anisotropic failure criteria. Numerous such criteria have been proposed to capture the deformation behavior of anisotropic rocks under different loading conditions. Duveau et al summarize many of these criteria and categorize them into distinct groups. See, e.g., Duveau, G., J. F. Shao and J. P. Henry, 1998, Assessment of some failure criteria for strongly anisotropic rocks. Mech. Cohes-frict. Mater. 3: 1-26. The first group includes discontinuous criteria such as the single plane of weakness (SPW) model. In criteria of this form, there is a distinction between failure on a weak plane (such as a bedding or lamination plane) and failure of the bulk material (where the failure surface cuts through such planes of weakness). With this theory the strength of the rock is uniform with respect to orientation if the failure does not occur on a weak plane and variable if it does. Results for this simplest example of planar anisotropy can be based on the well-known two-dimensional theory for sliding on a plane of weakness whose normal makes an orientation angle β with the maximum principal stress, $\sigma_1$-direction. See, e.g., Jaeger. If the plane of weakness has strength properties $\tau_0^w$ is the cohesive strength and $\phi^w$ is the angle of internal friction, the criterion for failure in the plane of weakness is given by the well-known linear Coulomb criterion. See, e.g., Coulomb, C. A. 1773. Application des regles de maxima et minima a quelques problemes de statique relatifs a 1' architecture. [application of the rules of maxima and minima to some problems of statics related to architecture]. Acad. Roy. Sci. Mem. Math. Phys. 7: 343-382. The linear Coulomb criterion is shown by the following Equation (1).

$$|\tau| = \tau_0^w + \sigma_n \tan \phi^w \qquad \text{Equation (1)}$$

where the shear stress τ and normal stress $\sigma_n$ on the weakness plane are determined by the maximum and minimum principal stresses ($\sigma_1$ and $\sigma_3$ respectively) and the orientation angle β according to the following Equations 2 and 3:

$$\tau = -\frac{1}{2}(\sigma_1 - \sigma_3)\sin 2\beta \qquad \text{Equation (2)}$$

$$\sigma_n = \frac{1}{2}(\sigma_1 + \sigma_3) + \frac{1}{2}(\sigma_1 - \sigma_3)\cos 2\beta \qquad \text{Equation (3)}$$

Substituting Equation (2) and Equation (3) into Equation (1) enables determination of the maximum principal stress difference ($\sigma_1 - \sigma_3$) sustainable by the plane of weakness before failure, for a given orientation angle β: This is provided in Equation (4) below.

$$(\sigma_1 - \sigma_3) = 2(\tau_0^w + \sigma_3 \tan \phi^w)/((1 - \tan \phi^w \cot \beta)\sin 2\beta) \qquad \text{Equation (4)}$$

As given by Equation (4), the stress difference at failure $(\sigma_1 - \sigma_3)$ tends to infinity as $\beta \to \frac{1}{2}\pi$ and as $\beta \to \phi^w$. Between these values, failure of the plane of weakness is possible and has a minimum value at $\beta_{min}^w$ given as given by Equation (5):

$$\beta_{min}^w = 90° - \frac{1}{2}\tan^{-1}(\cot\varphi^w) \qquad \text{Equation (5)}$$

This is the orientation most favorable for failure. However, for unfavorable values of orientation angle β, failure may take place through the bulk material on a plane which cuts across the plane of weakness. If the Coulomb criterion is again utilized to describe bulk failure with material properties $\tau_0^b$ is the cohesive strength in the bulk material and $\phi^b$ is the angle of internal friction in the bulk material, failure occurs based on the same criterion as the weak plane (Equation (1)), but with the maximum principal stress difference ($\sigma_1-\sigma_3$) sustainable by the bulk material before failure now given by Equation (6):

$$(\sigma_1 - \sigma_3) = 2\left[\tau_0^b \cot\varphi^b + \frac{1}{2}(\sigma_1 + \sigma_3)\right]\sin\varphi^b \quad \text{Equation (6)}$$

The induced shear failure plane within the bulk material is orientated such that its outward normal forms an acute angle $\beta^b$ with the maximum principal stress direction where:

$$\beta^b = \frac{1}{4}\pi + \varphi^b/2 \quad \text{Equation (7)}$$

The SPW model therefore predicts that, for a given value of $\sigma_3$, the magnitude of $\sigma_1$ required to induce failure somewhere within the anisotropic rock is equal to the lesser of the two values as defined by Equation (4) and Equation (6). If, for a given orientation angle β, the value given by Equation (4) is less than that given by Equation (6), failure occurs along the plane of weakness. Conversely, if the value given by Equation (4) is greater than that given by Equation (6), the induced shear failure plane within the intact rock cuts through the plane of weakness at an orientation as given by Equation (7).

It is evident from Equation (4) that the variation of ($\sigma_1-\sigma_3$) with orientation angle β has the same form for each of the values of $\sigma_3$, but with a different multiplying factor. The nature of this variation is illustrated in the graph 300 of FIG. 3 in which the magnitude of $\sigma_1$ that causes failure is plotted as a function of orientation angle β for four values of $\sigma_3$. This graph 300 is an example of single plane of weakness (SPW) model illustrating variation of the maximum principal stress $\sigma_1$ that induces failure shown along the stress axis 302 in Mega Pascals (MPa) as a function of orientation angle β shown along the angle axis 304 in degrees between the normal to the plane of weakness and the $\sigma_1$-direction, for four different minimum principal stress $\sigma_3$ magnitudes, and strength parameters: $\tau_0^b$ is 10 Mega Pascals (MPa); $\phi_b$ is 33°; $\tau_0^w$ is 5 MPa; and $\phi_w$ is 28°. The different minimum principal stress $\sigma_3$ magnitudes are 20.68 MPa for response 305a, 13.79 MPa for response 305b, 3.45 MPa for response 305c, and 0 MPa for response 305d.

In the graph 300, the concave-upwards portions of each curve, such as portions 306a, 306b, 306c and 306d, correspond to the criterion given by Equation (4) and represent β-dependent failure along the plane of weakness. The horizontal portions of each curve are derived from Equation (6) and represent β-independent failure within the intact rock along a plane defined by Equation (7).

Figure 4:
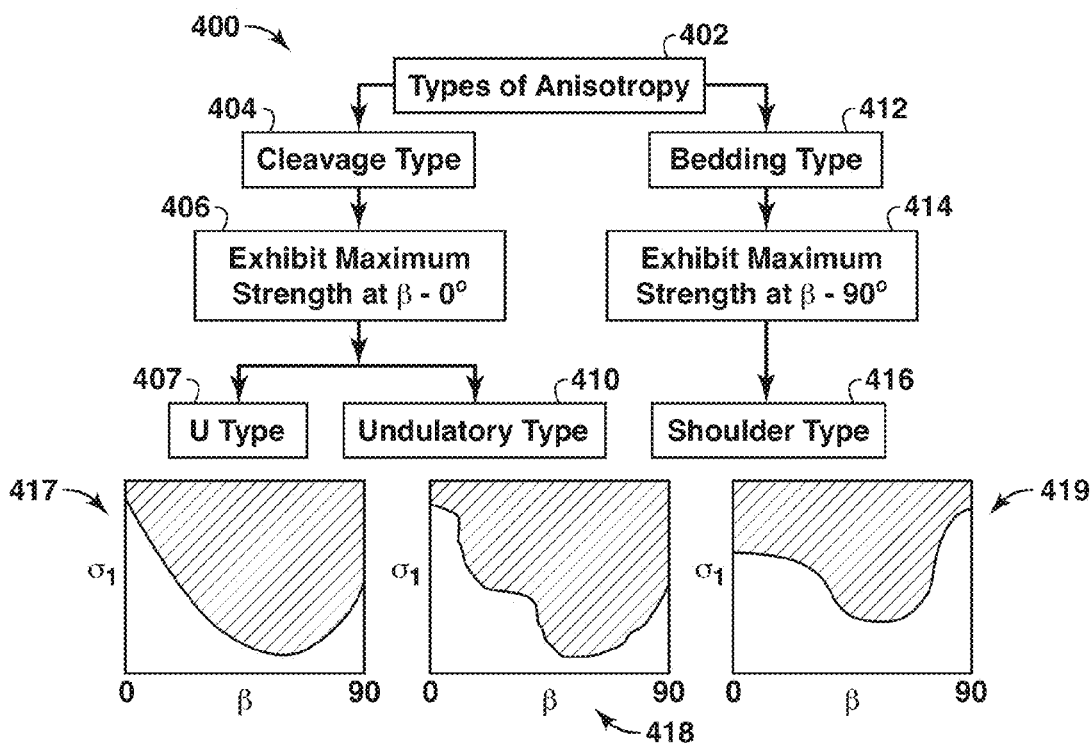
FIG. 4 is flow diagram of the classification of anisotropy types based on the shape of the strength versus orientation profile.

While the advantages of the SPW model are that it is theoretically-based and fully-described using only four material parameters ($\tau_0^b$, $\phi^b$, $\tau_0^w$, $\phi^w$) the considerable disadvantage of this criterion is illustrated schematically in FIG. 4. FIG. 4 is flow diagram 400 of the classification of anisotropy types based on the shape of the strength versus orientation profile. FIG. 4 is modified from Ramamurthy, T. 1993. Strength and modulus response of anisotropic rocks. In Comprehensive Rock Engineering Vol. I, ed. J. Hudson, 313-329.

In this flow diagram 400, various blocks indicate differentiating criteria to classify the types of anisotropy. For example, the types of anisotropy are described in block 402, which divide into a cleavage type in block 404 and a bedding type in block 412. The cleavage type may exhibit a maximum strength at orientation angle β equal to 0°, which is utilized to divide the types into a U Type in block 407 (e.g., associated with profile 417) and an Undulatory Type in block 410 (e.g., associated with profile 418). The bedding type may include exhibiting maximum strength at orientation angle β equal to 90°, as shown in block 414. Then, the shoulder type may be determined as shown in block 416 (e.g., associated with profile 419).

These classifications may be provided as a profile, such as profiles 417, 418 and 419, which compare the strength versus orientation for each profile. Although some experimental results (particularly for slates) show general agreement with the SPW model, as shown in profile 417, many anisotropic sedimentary rocks exhibit pronounced asymmetry in the shape of their strength $\sigma_1$ versus orientation angle β profiles which cannot be satisfactorily modeled using the SPW criterion, as shown in profiles 418 and 419.

A second category of anisotropic failure criteria distinguished by Duveau includes those models which describe a continuous variation in strength with orientation such that no explicit distinction is made between failure along planes of weakness and failure of the bulk material. In one such formulation, Jaeger generalized the well-known Coulomb theory for shear failure to the case in which cohesive strength $\tau_0$ was not constant but varied with orientation angle β. See, e.g., Jaeger, J. C. 1960. Shear failure of anisotropic rocks. Geol. Mag. 97: 65-72. The equation is shown below in Equation (8):

$$\tau_0 = A^* - B^* \cos 2(\beta - \beta_{min}) \quad \text{Equation (8)}$$

where $A^*$ and $B^*$ are fitting parameters and $\beta_{min}$ is the orientation angle at which cohesive strength exhibits a functional minimum. In this variable cohesive strength (VCS) model, the associated internal friction angle φ is not directly specified, but is assumed to be independent of direction. Because the VCS model uses a periodic (cosine) function to fit cohesive strength data and Coulomb theory predicts that $\beta_{min}=45+\phi/2$ (Equation (7)), such that $\beta_{min} \geq 45°$, it follows that the magnitude of $\tau_0$ at the orientation angle β=0° is greater than that at the orientation angle β=90°. This is a constraint placed by the model that does not represent the observed variation in strength for many anisotropic rock types. McLamore et al. expanded upon the VCS model by postulating additional periodic variation in friction angle with orientation and allowing both cohesion and friction angle to have dependence on a cosine function raised to a power n, as shown in Equation (9):

$$(\tau_0,\phi) = A_{1,2} - B_{1,2}[\cos 2(\beta - \beta_{min})]^n \quad \text{Equation (9)}$$

where $A_1$ and $B_1$ are $\tau_0$ and φ-specific empirical constants that describe the behavior of $\tau_0$ and φ over the range $0° \leq \beta \leq \beta_{min}$ and $A_2$ and $B_2$ the equivalent empirical constants for the range $\beta_{min} \leq \beta \leq 90°$. The terms $A_{1,2}$ and $B_{1,2}$ represent $A_1$ or $A_2$ and $B_1$ or $B_2$ for different equations of this terms. It is therefore evident that Equation (9) requires a total of twelve empirically determined constants to fully describe strength anisotropy. Both the SPW and VCS anisotropic failure criteria detailed above can only be determined for a specific subsurface lithology of interest through orientated triaxial compression testing of recovered core, to directly measure $\sigma_1$ equal $f(\sigma_3, \beta)$ data that can subsequently be used to calibrate each model. Although the modified VCS model of McLamore et al. offer increased congruency with experimental data, utilization of this criterion for describing strength anisotropy in a subsurface lithology of interest for which no core was available for geomechanics testing, involves having to predict the requisite twelve empirical constants which poses a considerable challenge.

With regard to predictive techniques, as rock strength is directly quantified from laboratory testing, core recovery issues dictate that many geomechanical problems have to be addressed in the absence of samples. Accordingly, there exists a plethora of empirical equations in the literature for relating mechanical strength properties to other physical properties potentially derivable from geophysical wireline logs, which can be utilized when no core is available for testing. Mechanical properties evaluation is primarily based on application of the most appropriate of these pre-determined predictors to logs derived from the subsurface strata of interest, calibrated where possible against limited core measurements often from offset wells.

Most empirical predictors are explicit to particular rock types (e.g., sandstone, carbonate or shale) and the majority relates rock strength to either acoustic velocities, the equivalent dynamic elastic moduli, or porosity. Predicted strength parameters are predominantly those that describe the linear Coulomb-type failure criterion (as noted in Coulomb), specifically unconfined compressive strength (UCS), cohesive strength $\tau_0$ and internal friction angle $\phi$. Comprehensive summaries of numerous such empirical equations sourced from the literature that relate rock strength parameters to other physical properties are given in Change and Khakar. See, e.g., Chang, C., M. D. Zoback and A. Khaksar. 2006. Empirical relations between rock strength and physical properties in sedimentary rocks. J. Pet. Sci. & Eng. 51: 223-237 and Khaksar, A., P. G. Taylor, Z. Fang, T. Kayes, A. Salazar and K. Rahman. 2009. Rock strength from core and logs: where we stand and ways to go. Proceedings of the SPE EUROPEC/EAGE Annual Conference & Exhibition, Amsterdam, 8-11 Jun. 2009.

By way of an example for shales, several references describe robust negative power law relationships between UCS and porosity, while others describe positive correlations between UCS and compressional sonic velocity. However, as strength is controlled by complex rock fabric on the microscale, oftentimes core-derived rock strength data can show considerable variation as a function of single input parameters, such as velocity, elastic modulus or porosity, such that most empirical predictors are not sufficiently generic to fit all published strength versus physical property data. See, e.g., Lashkaripour, G. R., and M. B. Dusseault. 1993. A statistical study on shale properties: relationship among principal shale properties. In Proceedings of the Conference on Probabilistic Methods in Geotechnical Engineering, Canberra, 10-12 February; Horsrud, P. 2001. Estimating mechanical properties of shale from empirical correlations. SPE Drilling & Completion, 16: 68-73; Lal, M. 1999. Shale stability: drilling fluid interaction and shale strength. Proceedings of the SPE Latin American and Caribbean Petroleum Engineering Conference, Caracas, 21-23 Apr. 1999; and Ingram, G. M. and J. L. Urai. 1999. Top-seal leakage through faults and fractures: the role of mudrock properties. In, Muds and Mudstones: Physical and Fluid Flow Properties. Geological Society London, Special Publications, 158: 125-135.

Multi-variate algorithms can offer improved congruency with experimental data, for example Coulomb strength parameters in sandstone-to-shale siliciclastic rocks can be predicted from algorithms relating $\tau_0$ and $\phi$ to porosity and lithology, the latter defined by total clay content which can be directly quantified by the X-ray diffraction XRD technique or derived from petrophysical analysis of wireline logs. See, e.g., United States Patent Application No. 2011/0015907, Publication Date: Jan. 20, 2011. Another shale-specific strength predictor correlates shale strength to surface area as derived from the dielectric constant measurement (DCM) technique. See, e.g., Leung, P. K. and Steiger, R. P. 1992. Dielectric constant measurements: a new, rapid method to characterize shale at the wellsite. Proceedings of the IADC/SPE Drilling Conference, New Orleans, 18-21 Feb. 1992. Shale surface area represents a measure of the total fraction of swelling clays and DCM can be readily performed on drilling cuttings. An extensive shale strength database acquired through consolidated undrained triaxial testing may be compiled to develop the predictive regression which relates shale strength (octahedral shear stress at failure) to mean effective stress and shale surface area. See, e.g., Steiger, R. P. and P. K. Leung. 1992. Quantitative determination of the mechanical properties of shales. SPE Drilling & Completion, 7: 181-185.

Implicit in the above predictive techniques is that strength properties are derived from databases of laboratory measurements in which core testing is conducted on samples with any planar geologic fabric orientated perpendicular to the direction of maximum compressive stress (e.g., at orientation angle $\beta=0°$), such that predicted mechanical properties relate specifically to bulk (trans-laminar) strength in which induced failure planes cut across bedding laminations, so that these techniques offer no predictive capability for quantifying strength anisotropy associated with the presence of such weakness planes.

Compared with the relatively numerous bulk strength predictive techniques that have been developed via calibration with laboratory data as described above, techniques for predicting strength anisotropy without recourse to core testing are relatively few.

As an example, Willson et al proposed a formulation for describing unconfined compressive strength (UCS) variation relative to bedding orientation, in which the level of strength anisotropy is characterized via two constants in Equations (10) and (11):

$$k_1 = UCS_\parallel / UCS_\perp \qquad \text{Equation (10)}$$

$$k_2 = UCS_{min} / UCS_{max} \qquad \text{Equation (11)}$$

In Equation (10) $UCS_\parallel$ is the strength with bedding parallel to the $\sigma_1$-direction ($\beta=90°$) and $UCS_\perp$ is the strength with bedding perpendicular to the $\sigma_1$-direction (e.g., orientation angle $\beta=0°$) and in Equation (11) $UCS_{min}$ is the minimum strength for any orientation and $UCS_{max}$ the maximum strength for any orientation. To derive a smoothly varying strength profile with orientation angle the following assumptions were made: $UCS_\perp = UCS_{max}$; $UCS_{min}$ occurs at orientation angle $\beta=45°$. Based on these assumptions the following orientation-dependent unconfined compressive strength variation was proposed:

$$UCS(\beta) = UCS_{max}(\cos\phi + k_1 \sin\beta)(1-\sin\beta\cos\beta)[1-2\sin\beta\cos\beta(1-4k_2/\sqrt{2}(1+k_1))] \qquad \text{Equation (12)}$$

Equation (12) describes strength anisotropy from knowledge of only three direct measurements ($UCS_\parallel$, $UCS_\perp$ and $UCS_{min}$). While $UCS_\perp$ is potentially predictable from empirical correlations with geophysical wireline measurements (for example porosity or acoustic velocities, see, e.g., Chang) some recovered core from the subsurface strata of interest may be available for direct laboratory measurement of $UCS_\parallel$ and $UCS_{min}$. In addition, knowledge of unconfined compressive strength ($\sigma_3=0$) alone is insufficient for determining anisotropic strength at elevated confining pressures (e.g., $\sigma_3>0$), which requires additional information regarding the magnitude of the associated internal friction angle $\phi$. Another disadvantage relates to the form of this orientation-dependent unconfined compressive strength variation, which due to the imposed assumptions, is constrained to always predict $UCS_{min}$ at orientation angle $\beta=45°$ and $UCS_\parallel$ at orientation angle ($\beta=90°$) less than $UCS_\perp$ at orientation angle ($\beta=0°$) for all fine-grained rock types, which is not in agreement with many experimental observations, as noted above in the discussion associated with FIG. 4.

Smith and Goldman describe a technique for assaying the compressive strength of rock, primarily based upon a database of laboratory measurements from which strength versus porosity correlations are extracted. See, e.g., U.S. Pat. No. 5,767,399. While the technique mainly addresses unconfined compressive strength, the present techniques expand this to accommodate other factors that impact rock strength, such as confining stress, bedding plane orientation and temperature. Due to the predictive methodology underlying the technique, ideally calibration involving laboratory testing of pure lithologies (e.g., clean sandstone and/or shale) recovered from the well of interest is required. However, lithologically similar samples (perhaps from offset wells) may suffice. The technique has limitations when used to predict strength in mixed lithologies, such as shaly sandstones or sandy shales, as it relies on a weighted average of the pure end member components which can lead to significant predictive uncertainty. In the present techniques, the strength versus orientation relationship is represented by a curve corresponding to an equation of the form in Equation (13):

$$\sigma_{co}=S_e[\sigma_{umax}+\Delta\sigma_{max}(\sigma_3/\sigma_{3max})^\beta](1-c_{omax})+(1-S_e)[\sigma_{umin}+\Delta\sigma_{min}(\sigma_3/\sigma_{3max})^\beta](1-c_{omin}) \quad \text{Equation (13)}$$

where, for $0°<\beta\leq\beta_c$:
$\gamma=(\beta/\beta_c)\pi/2$
$f_1=(\sigma_{\beta=0}-\sigma_{\beta=\beta_c})/\sigma_{\beta=0}$, at zero porosity
$f_2=f_1$ at maximum porosity
$c_{omax}=f_1\sin^n(\gamma)$
$c_{omin}=f_2\sin^n(\gamma)$
and for $\beta_c<\beta\leq 90°$:
$\gamma=\pi/2+(\beta-\beta_c)/(1-\beta_c 2/\pi)$
$f_3=(\sigma_\beta=90-\sigma_{\beta=0})/\sigma_{\beta=0}$, at zero porosity
$f_4=f_3$ at maximum porosity
$c_{omax}=(f_1+f_3)\sin^n(\gamma)-f_3$
$c_{omin}=(f_2+f_4)\sin^n(\gamma)-f_4$
and:
- $\sigma_{co}$=compressive strength adjusted for confining pressure and orientation
- $c_{omax}$=maximum orientation correction at zero porosity
- $c_{omin}$=minimum orientation correction at zero porosity
- $f_1$=maximum percent reduction in compressive strength at critical relative dip angle ($\beta=\beta_c$ as compared to $\beta=0°$) at zero porosity
- $f_2$=maximum percent reduction in compressive strength at critical relative dip angle ($\beta=\beta_c$ as compared to $\beta=0°$) at maximum porosity
- $f_3$=maximum percent increase in compressive strength parallel to dip angle ($\beta=90°$ as compared to $\beta=0°$) at zero porosity
- $f_4$=maximum percent increase in compressive strength parallel to dip angle ($\beta=90°$ as compared to $\beta=0°$) at maximum porosity
- $S_e=(1-\phi/\phi_{max})^\alpha$
- $\phi$=porosity
- $\phi_{max}$=maximum porosity
- $\alpha$=a mineralogy value
- $\beta$=orientation angle of normal to bedding planes
- $\beta_c$=critical orientation angle where compressive strength reaches a minimum value
- $\gamma$=sine function parameter derived from relative dip angle that reaches a maximum value of $\pi/2$ when $\beta=\beta_c$
- $\sigma_\beta$=compressive strength at a specific relative dip angle, $\beta$
- $n$=an orientation exponent The advantage of the present techniques is that knowing the general form of Equation (13) as well as the general form of its representation as a curve (a conjunction of portions of two different sine waves) provides characterization of the full-range of experimentally observed orientation-dependent compressive strength variations, including asymmetric profiles, as shown schematically in profiles 418 and 419 of FIG. 4.

In the present techniques, the strength prediction may be limited to correlations using porosity alone as data input, and precludes the use of other log-based strength correlations that may be more appropriate for a given lithology or region (generally field-, geologic age- or depth-specific) such as acoustic velocity and DCM predictors. Disadvantages to utilizing existing porosity-based shale strength predictors are detailed below.

Direct porosity measurement in fine-grained rock formations, such as shales, is difficult to accomplish using traditional core analysis methods (such as, Mercury injection, Dean Stark solvent extraction or Boyle's law Helium porosimetry) due to the large impact of coring-induced microcracking and fluid invasion effects. To overcome this, typical analysis is performed on crushed rock samples to eliminate coring-induced artifacts while maintaining representation of pore structure. However, measured porosity can still exhibit considerable dependency on the measurement technique due to difficulties in discriminating free and bound water. See, e.g., Handwerger, D. A., R. Suarez-Rivera, K. I. Vaughn and J. F. Keller. 2011. Improved petrophysical core measurements on tight shale reservoirs using retort and crushed samples. In Proceedings of the SPE Annual Technical Conference and Exhibition, Denver, 30 Oct.-2 Nov. 2011. Also, petrophysical techniques for deriving porosity from geophysical wireline logs are typically only calibrated against core measurements derived from the reservoir section, so that log-based porosity in intervening shale sections may be prone to considerable error without additional advanced interpretation.

The present techniques involve predicting the degree of shear strength anisotropy encountered in subsurface fine-grained rock formations (particularly shales) without recourse to coring the subsurface strata of interest and performing laboratory strength measurements. The present techniques use a pre-established database of strength measurements derived from orientated core testing to develop predictive algorithms relating parameters describing the degree of strength anisotropy associated with diverse geologic planes of weakness (such as bedding, lamination or cleavage planes) to bulk strength properties easily derived from geophysical wireline logs using a variety of established petrophysical techniques.

With regard to planar geologic fabrics in sedimentary rocks, the terms "bedding" and "lamination" refer to stratification thicker than 1 centimeter (cm) and thinner than 1 cm, respectively. However, both may be defined by changes in sediment grain-size, color or mineralogical composition, such that the terms may be used interchangeably to imply planes of weakness in sedimentary rocks resulting from changes in the pattern of sedimentation. Similarly, with regard to foliated textures in metamorphic rocks, the terms "slaty cleavage", "schistosity" and "gneissic mineral banding" refer to specific fabrics associated with increasing metamorphic grade (pressure and temperature conditions). However, they represent the preferential alignment of minerals within a directional stress field, such that the terms may be used interchangeably to imply planes of weakness in metamorphic rocks resulting from preferential alignment of platy minerals such as chlorite, muscovite and biotite, or the segregation banding of granular and platy mineral concentrations.

As long as the subsurface strata of interest are broadly lithologically similar to a particular fine-grained rock type characterized in the database, then the pre-established predictive algorithms can be utilized to generate subsurface anisotropic strength parameters, without direct incorporation of orientated core measurements from the subsurface strata of interest within the database. For example, if the pre-established database contains mainly orientated strength measurements conducted on sedimentary shales, then it cannot be used to generate subsurface anisotropic strength parameters in metamorphic slates, and vice versa.

The present techniques may involve obtaining relationships between planes of weakness and bulk material strength for a plurality of rock samples; obtaining bulk strength of target rock (e.g., well logs, pre-established techniques, etc.); calculating the planes of weakness for the target rock (strength anisotropy); and using the results to enhance models, which may be used for wellbore stability analysis or enhancing recovery.

The method for predicting strength anisotropy in fine-grained subsurface formations may include various steps. For example, the method may include compiling a database of core-based strength measurements over a range of orientations and confining pressures for a plurality of fine-grained rock formations; utilizing an automated surface fitting procedure to determine a common 3D anisotropic failure criterion for all database rocks; developing predictive algorithms relating anisotropy parameters in 3D failure criterion and equivalent bulk strength properties; generating subsurface bulk strength properties in strata of interest using established petrophysical techniques; utilizing pre-established predictive algorithms and subsurface bulk strength properties to calculate equivalent anisotropic strength properties in subsurface strata of interest; utilizing predicted anisotropic rock strength for subsurface strata of interest in numerical models of the subsurface.

As an example, a workflow is shown in the flow chart 500 of FIG. 5, which is also described further below. The workflow is shown schematically in FIG. 5 and includes: compiling a database of orientated triaxially compressive strength measurements for a plurality of fine-grained rock formations, as shown in block 502; utilizing an automated surface fitting procedure to generate a common 3D anisotropic failure criterion for each fine-grained rock formation, as shown in block 504; developing predictive algorithms relating the anisotropy strength parameters describing the 3D anisotropic failure criterion for each fine-grained rock formation and their equivalent bulk strength properties, as shown in block 506; statistical tools may be utilized to evaluate the goodness of fit between the observed and predicted strength values, as shown in decision block 508; in the event the statistical tool determines that no good fit is shown, the database of rock measurements and/or the predictive algorithm may be adjusted; in the event the statistical tool determines that a good fit is established, the process continues by generating bulk strength properties in the subsurface strata of interest using a variety of established petrophysical techniques, as shown in block 510; utilizing the predictive algorithms pre-established from the database (block 506) and the bulk strength properties in the subsurface strata of interest (block 510) to determine the equivalent anisotropic strength properties in the subsurface strata of interest, as shown in block 512; utilizing the predicted anisotropic rock strength properties (block 512) of the subsurface strata of interest in numerical models of the subsurface, including analytical and computational methods for optimizing mud weight design in ERD wells, as shown in block 514.

The present techniques provide various enhancements over other methods. For example, the present techniques predict the degree of shear strength anisotropy encountered in subsurface fine-grained rock formations (particularly shales) without recourse to coring the subsurface strata of interest and performing laboratory strength measurements. Also, the present techniques predict anisotropic strength functions that can subsequently be used in numerical models of the subsurface, including analytical and computational methods for optimizing mud weight design in high-angle/horizontal extended reach wells in which inclinations can approach bed-parallel. The present techniques also utilize bulk strength properties to predict anisotropic failure criteria without any restrictions on the source of the bulk strength properties (directly measured on core, or estimated from geophysical wireline logs or cuttings/cavings analyses). Further, the techniques are not restricted to any one specific anisotropic failure criterion (predicts any discontinuous or continuous model) or anisotropic rock type (predicts any fine-grained rock with either a planar sedimentary fabric or foliated metamorphic texture). Moreover, the present techniques incorporate standard analysis of variance statistical tools in the predictive workflow. Further still, the techniques provide a simple index for comparing the magnitude of strength anisotropy between diverse fine-grained rock types. To further describe the present techniques, various aspects are described further in FIGS. 1 to 5, which are noted above, and FIGS. 5 to 20.

As noted above, the flow chart 500 in FIG. 5 includes various blocks to perform one embodiment of the present techniques. In block 502, a compilation of a database of triaxially compressive strength measurements derived from laboratory testing of core plugs sourced from a plurality of fine-grained rocks is compiled. Fine-grained rocks are specifically preferred as such lithologies (for example clay-rich argillaceous shales, carbonate rich calcareous marls, metamorphic slates etc.) tend to exhibit the greatest degree of strength anisotropy associated with relatively weak planar geologic fabrics such as bedding, lamination or cleavage planes, by comparison with coarse-grained unconsolidated sand, sandstone and carbonate formations. Preferably, the majority of fine-grained rock formations included in the database should be of broadly similar lithology to the subsurface strata of interest. Preferably, the database should include a statistically significant number of fine-grained rock formations.

Strength data included in the database for each fine-grained rock formation includes maximum axial compressive strength $\sigma_1$ measured over a range of confining pressure $\sigma_3$ magnitudes at different orientation angles $\beta$ (defined as the angle between the normal to the planar layering and the direction of maximum compressive stress $\sigma_1$). Preferably, for each fine-grained rock formation, a series of orientated, triaxially compressive strength tests should be conducted for at least seven $\beta$ orientations in 15° increments from the vertical (orientation angle $\beta=0°$) to the horizontal (orientation angle $\beta=90°$) direction. The minimum number of orientation angles tested should be three (orientation angles $\beta=0°$, 45 or 60°, 90°). Preferably, for each fine-grained rock formation, orientated, triaxially compressive strength tests should be conducted for at least four constant confining pressure $\sigma_3$ magnitudes for each orientation angle $\beta$. The minimum number of confining pressures tested should be three. Therefore, preferably, each fine-grained rock formation in the database should have twenty-eight orientated triaxially compressive strength tests, and for a fine-grained rock formation to be included in the database, it should have a minimum of at least nine such associated tests.

Figure 6:
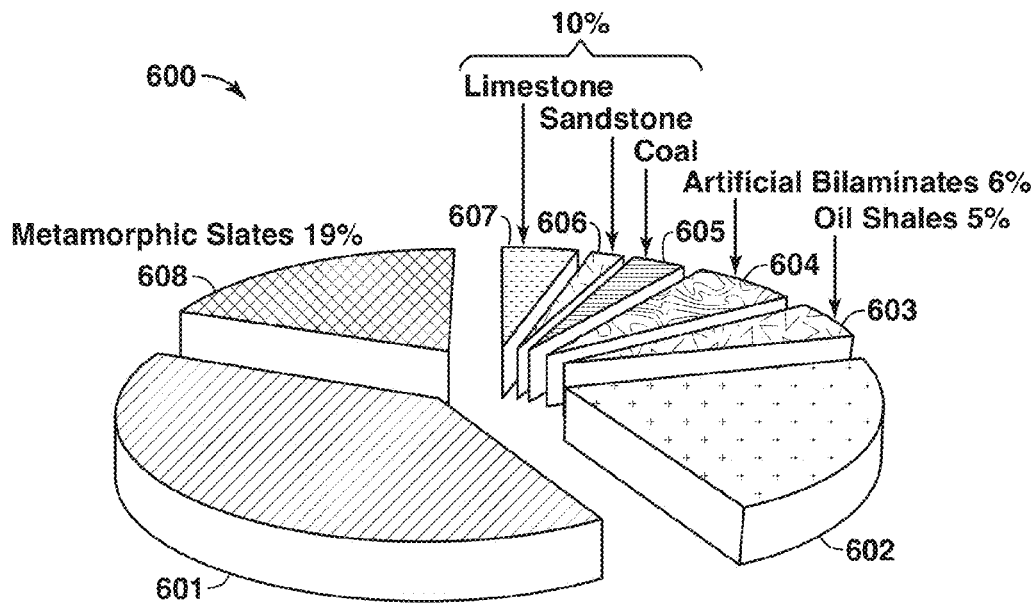
FIG. 6 is an exemplary graph of a fine-grained rock mechanical properties database used to develop predictive techniques for deriving shear strength anisotropy in subsurface formations.

A schematic illustration of a database is shown in FIG. 6. FIG. 6 is an exemplary illustration 600 of a fine-grained rock mechanical properties database used to develop predictive techniques for deriving shear strength anisotropy in subsurface formations. The depicted database includes eight generic rock types, each of which has a number of associated fine-grained rock formations: argillaceous and calcareous shales (39%) 601; laminated siltstones and mudstones (21%) 602; metamorphic slates (19%) 608; oil shales (5%) 603; artificial bilaminates (6%) 604; limestones (10%) 607; sandstones (10%) 606; and coals (10%) 605. The database may include thirty distinct fine-grained rock formations with a total of approximately nine-hundred discrete, orientated triaxial compression tests. Percentages refer to the number of core tests for each generic rock type relative to the total number of core tests in the database.

As laboratory measurement of compressive failure strength is particularly difficult to accomplish successfully in fine-grained rocks due to their associated ultra-low permeabilities, proper methods should be used to quality control the experimental data before inclusion in the database. As one of the objectives is to predict rock strength anisotropy for wellbore stability applications associated with extended reach drilling through shale formations, 81% of all orientated triaxial compression tests in the illustrative database were conducted on fine-grained sedimentary rocks, of which 65% can be described as generic shales. The additional anisotropic sedimentary rock types and metamorphic slates are included for comparative purposes.

Figure 5:
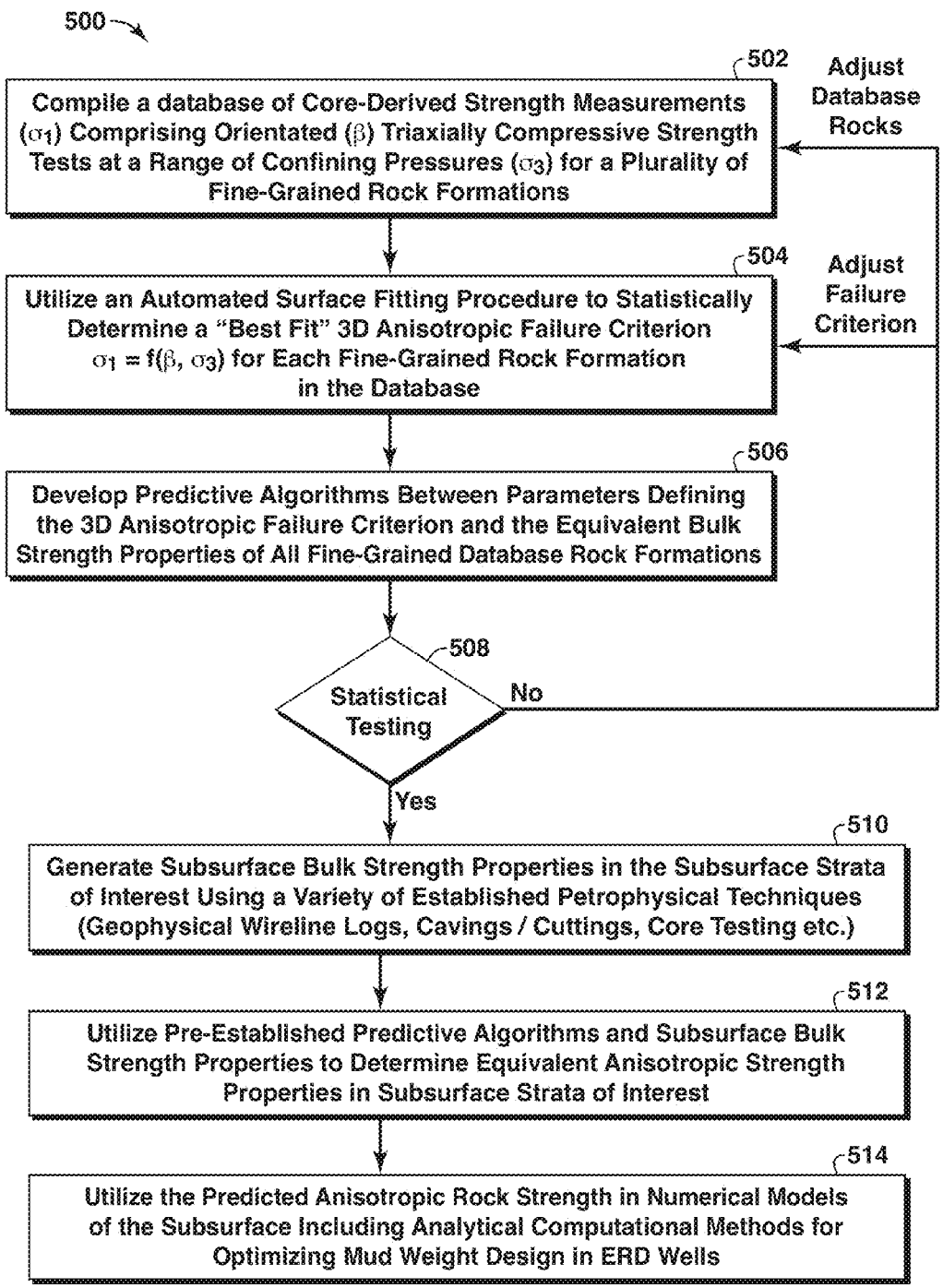
FIG. 5 is a flow chart of the predictive workflow in accordance with an exemplary embodiment of the present techniques.

In block 504 of the predictive workflow in FIG. 5, an automated surface fitting procedure is utilized to determine a common 3D anisotropic failure criterion for all database rocks. In the ideal embodiment, a 3D anisotropic failure criterion capable of defining all fine-grained rock formations in the database of core-measured strength values is derived as follows:

(i) perform a series of orientated, triaxially compressive strength tests for seven $\beta$ orientations in 15° increments from the vertical ($\beta=0°$) to the horizontal ($\beta=90°$) direction as in FIG. 2B. For each orientation angle, conduct at least four triaxial compression tests at different confining pressure $\sigma_3$ magnitudes.

Figure 7:
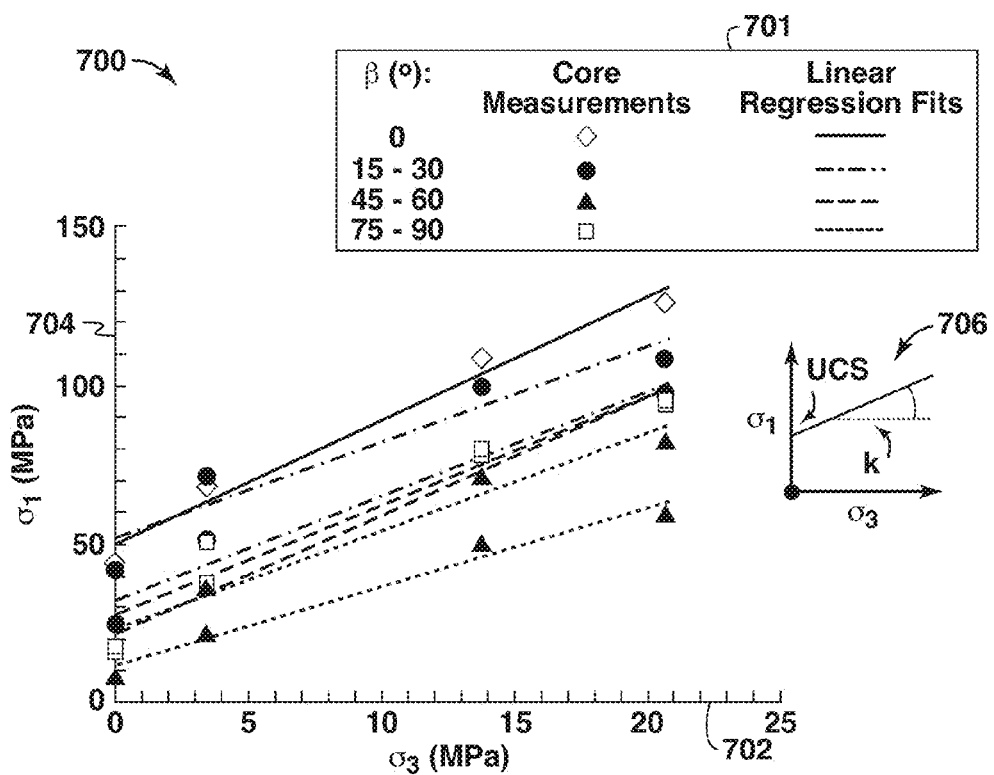
FIG. 7 is a graph of an exemplary analysis of one fine-grained database formation illustrating linear regression of each core-measured data pair for all orientation angles to quantify unconfined compressive strength (UCS) (e.g., intercept) and triaxial stress factor k (e.g., slope) constants.

(ii) perform a linear regression on measured $\sigma_1=f(\sigma_3)$ data pairs for each orientation angle $\beta$ quantify unconfined compressive strength (UCS) (intercept) and triaxial stress factor k (slope) constants. FIG. 7 is a graph 700 of an exemplary analysis of one fine-grained database formation illustrating linear regression of each core-measured (e.g., $\sigma_1=f(\sigma_3)$) data pair for orientation angles $\beta$ to quantify unconfined compressive strength (UCS) (intercept) and triaxial stress factor k (slope) constants. In this graph 700, the core measurements and linear regression fits for the different orientation angles (as shown in the legend 701) are shown in relation to the confining pressure axis 702 in MPa and the compressive stress axis 704 in MPa. The various symbols (e.g., diamond for $\beta=0°$; circle for $\beta=15°$ to 30°; triangle for $\beta=45°$) to 60°; square for $\beta=75°$ to 90°) indicate the core measurements associated with the different orientation angles, while the different line types (e.g., solid line for $\beta=0°$; dash-dot line for $\beta=15°$ to 30°; long dash for $\beta=45°$ to 60°; short dash for $\beta=75°$ to 90°) indicate the linear regression fits for the different orientation angles. Also, the chart 706 represents the unconfined compressive strength (UCS) and triaxial stress factor k (slope) constants for the graph 700.

Figure 8:
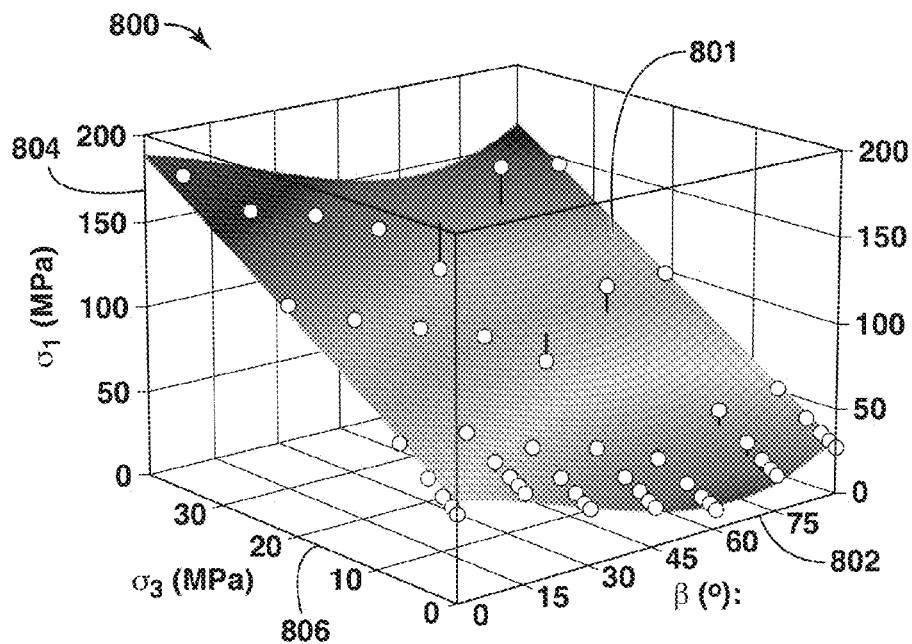
FIG. 8 is a graph of an exemplary analysis of one fine-grained database formation illustrating implementation of an automated 3D-surface fitting procedure to interpolate between core-derived 2D linear fits with the constraint that the surface fit has a common slope equal to the arithmetic mean of all core-derived "k" values.

(iii) implement an automated 3D-surface fitting procedure to interpolate between these orientation-dependent linear fits with the constraint that the surface fit should have a common slope in the $\sigma_1$ versus $\sigma_3$ plane equal to the arithmetic mean of all core-derived k values. FIG. 8 is a graph 800 of an example analysis of one fine-grained database formation illustrating implementation of an automated 3D-surface fitting procedure to interpolate between core-derived 2D linear fits with the constraint that the surface fit should have a common slope in the $\sigma_1$ versus $\sigma_3$ plane equal to the arithmetic mean of all core-derived k values. In this graph 800, the 3D-surface fit 801 is shown for the different orientation angles along the orientation axis 802 relative to the confining pressure axis 806 in MPa and the compressive stress axis 804 in MPa. The various spherical symbols represent linear regression fits to core measurements as described in (ii) above.

Figure 9:
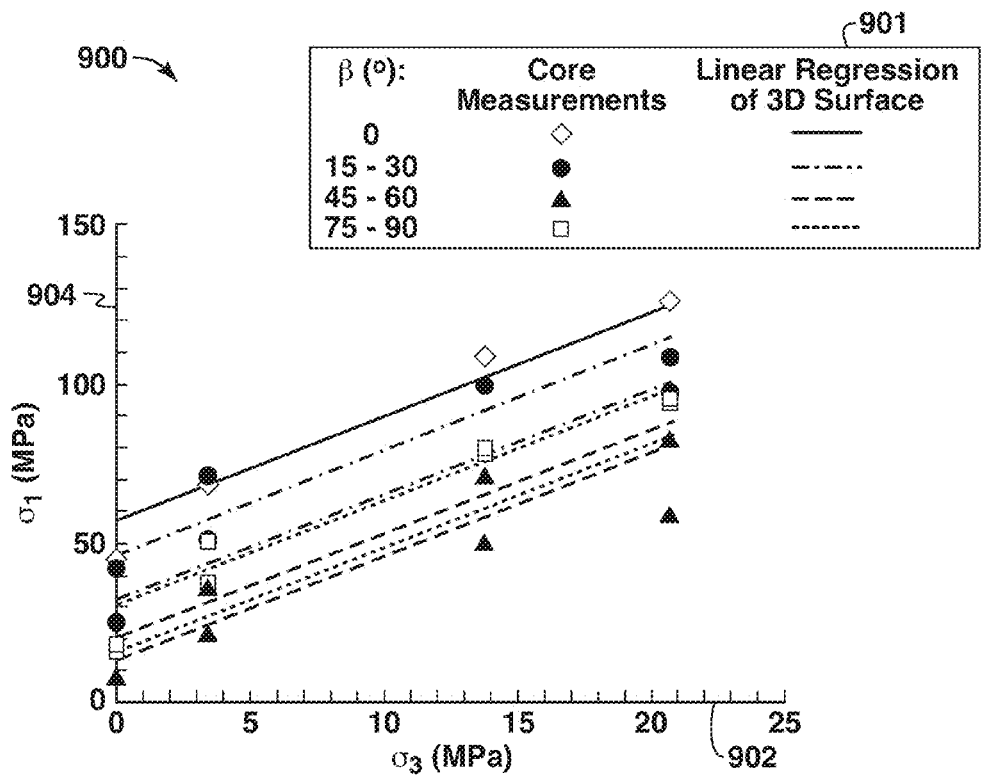
FIG. 9 is a graph of an exemplary analysis of one fine-grained database formation illustrating comparison of linear regression of smoothed 3D surface fit with core-measured data pairs.

(iv) linear regression for pressure dependency of principal stresses $\sigma_1=f(\sigma_3)$ at failure is then applied to the smoothed 3D surface fit for a given orientation angle $\beta$ in order to determine the equivalent UCS and k constants. FIG. 9 is a graph 900 of an exemplary analysis of one fine-grained database formation illustrating comparison of linear regression of smoothed 3D surface fit with core-measured $\sigma_1=f(\sigma_3)$ data pairs. In comparison to the linear regressions depicted in FIG. 7, which have orientation dependent k values, the surfaced-derived regressions of FIG. 9 have the same k value for each orientation angle. In this graph 900, the core measurements and linear regression fits for the different orientation angles (as shown in the legend 901) are shown in relation to the confining pressure axis 902 in MPa and the compressive stress axis 904 in MPa. The various symbols (e.g., diamond for $\beta=0°$; circle for $\beta=15°$ to 30°; triangle for $\beta=45°$ to 60°; square for $\beta=75°$ to 90°) indicate the core measurements associated with the different orientation angles, while the different line types (e.g., solid line for $\beta=0°$; dash-dot line for $\beta=15°$ to 30°; long dash for $\beta=45°$ to 60°; short dash for $\beta=75°$ to 90° indicate the linear regression fits to the 3D surface for the different orientation angles.

Figure 10:
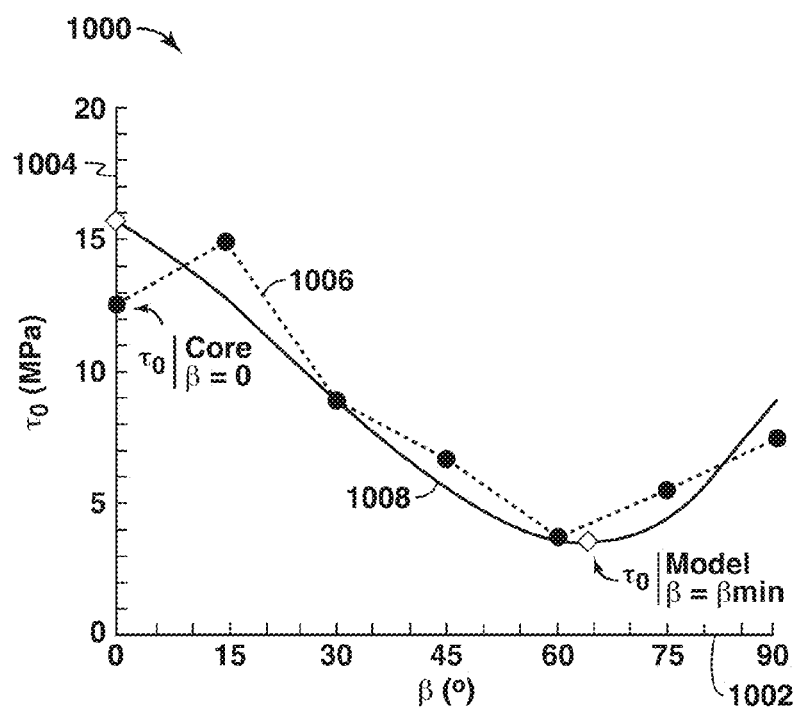
FIG. 10 is a graph of an exemplary analysis of one fine-grained database formation illustrating variation in core- and surface-derived cohesive strength with orientation angle.

(v) use UCS and k constants derived from linear regression of 2D core data and 3D surface data as described in (i) to (iv) above to determine cohesive strength $\tau_0$ versus orientation angle $\beta$ functions as shown in FIG. 10 using the transform in Equation (14):

$$\tau_0 = UCS/2\sqrt{k} \qquad \text{Equation (14)}$$

(vi) use the method of least squares to fit a third order polynomial function to the 3D surface-derived $\tau_0$ versus $\beta$ curve as shown in FIG. 10, having the form:

$$\tau_0(\beta) = A'\beta^3 + B'\beta^2 + C'\beta + \tau_0|_{\beta=0} \quad \text{Equation (15)}$$

where $\tau_0|_{\beta=0}$ represents the cohesive strength at $\beta=0°$ in which the direction of maximum loading is perpendicular to bedding and A', B' and C' are empirical constants. FIG. 10 is a graph 1000 of an exemplary analysis of one fine-grained database formation illustrating variation in core- and surface-derived cohesive strength $\tau_0$ with orientation angle $\beta$. In the depicted graph 1000, core-derived strength values (e.g., circles and dashed line 1006) correspond to the values generated from FIG. 7, whereas the surface-derived strength values (e.g., diamond and solid line 1008) correspond to the values generated from FIG. 9. In this graph 1000, the core-derived strength values and the surface-derived strength values are shown in relation to the orientation angle axis 1002 in degrees (°) and the cohesive strength axis 1004 in MPa. The diamond 1010 is the point where the surface-derived strength value is at a minimum. The circle 1012 is the point that represented the core measured cohesive strength value at an orientation angle of 0°.

Figure 11:
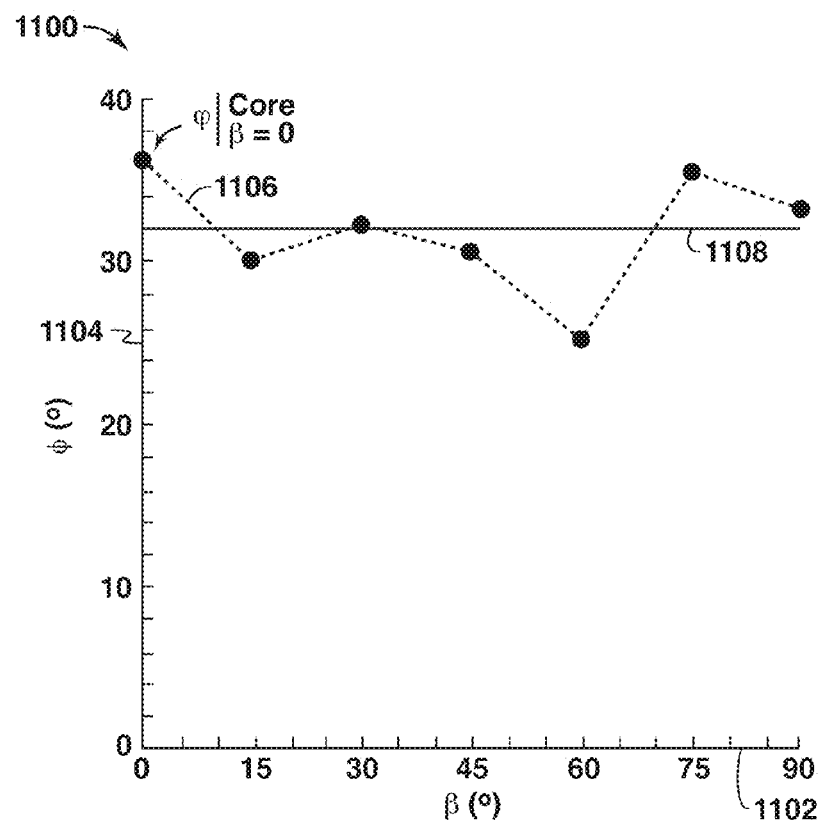
FIG. 11 is a graph of an exemplary analysis of one fine-grained database formation illustrating variation in core- and surface-derived internal friction angle with orientation angle.

(vii) use k constants derived from linear regression of 2D core data and 3D surface data as described in (i) to (iv) above to determine internal friction angle $\phi$ versus orientation angle $\beta$ functions. FIG. 11 is a graph 1100 of an exemplary analysis of one fine-grained database formation illustrating variation in core- and surface-derived internal friction angle $\phi$ with orientation angle $\beta$. In this graph 1100, the core-derived values (e.g., circles and dashed line 1106) and the equivalent surface-derived mean internal friction angle value $\bar{\phi}$ (e.g., solid line 1108) are shown in relation to the orientation angle axis 1102 in degrees (°) and the internal friction angle axis 1104 in degrees. Then, using the transform of Equation (16):

$$\tan \phi = (k-1)/(2\sqrt{k}) \quad \text{Equation (16)}$$

A modified failure criterion for describing anisotropic strength in shear stress $\tau$ versus normal stress $\sigma_n$ space, as derived from automated 3D surface fitting, therefore has the form in Equations (17), (18) and (19):

$$\tau(\beta) = \chi \cdot \tau_0|_{\beta=0} + \sigma_n \cdot \tan \bar{\phi} \quad \text{Equation (17)}$$

where:

$$\chi = \tau_0(\beta)\tau_0|_{\beta=0} = A\beta^3 + B\beta^2 + C\beta + 1 \quad \text{Equation (18)}$$

and:

$$\bar{\varphi} = \frac{1}{N}\sum_{i=1}^{N}\varphi_i \quad \text{Equation (19)}$$

The resultant anisotropic failure criterion as detailed in Equations (17), (18) and (19) therefore assigns all strength anisotropy to a systematic continuous variation in cohesive strength with orientation which is fit using a 3rd-order polynomial function. This polynomial VCS model can also be reproduced in principal stress space using Equation (20):

$$\sigma_1(\beta) = \left[\frac{2\tau_0(\beta)\cos\bar{\varphi}}{1-\sin\bar{\varphi}}\right] + \left[\frac{1+\sin\bar{\varphi}}{1-\sin\bar{\varphi}}\right]\sigma_3 \quad \text{Equation (20)}$$

Figure 12:
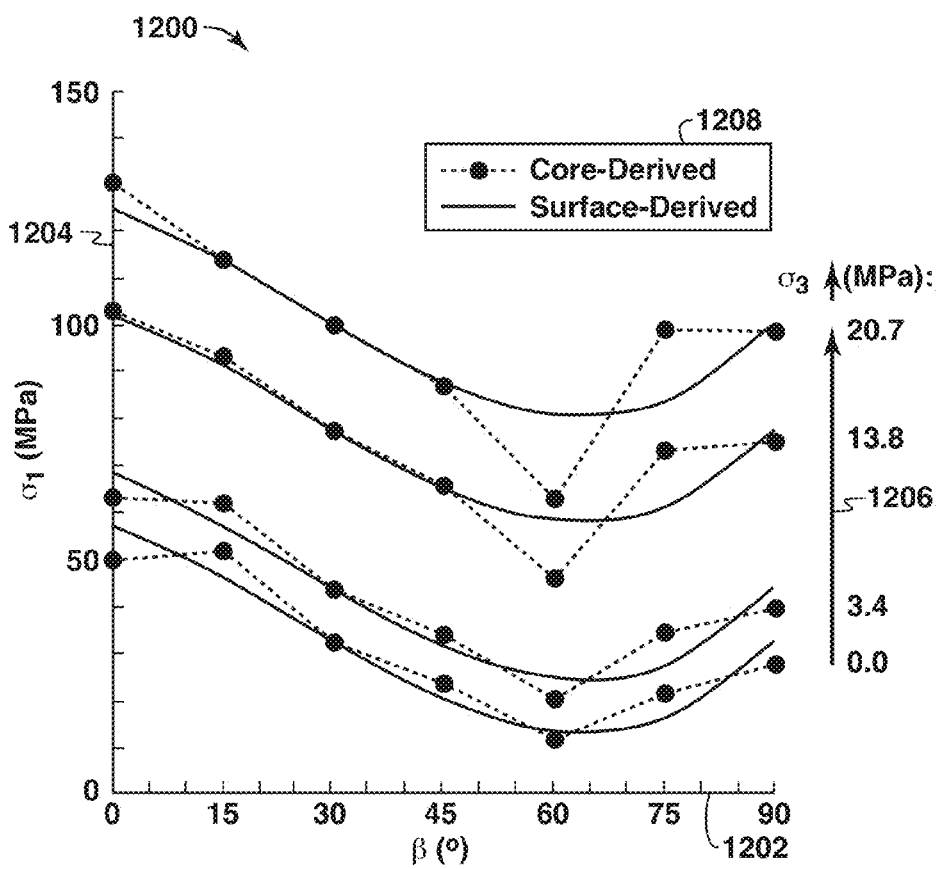
FIG. 12 is a graph of an exemplary analysis of one fine-grained database formation illustrating variation in core-derived and modeled peak strength values with orientation angle and confining pressure.

Both core-derived and modeled (using Equation (20)) principal failure stresses are contrasted in FIG. 12. FIG. 12 is a graph of an exemplary analysis of one fine-grained database formation illustrating variation in core-derived and modeled (using anisotropic 3D failure criterion) peak strength $\sigma_1$ values with orientation angle $\beta$ and confining pressure $\sigma_3$. In this graph 1200, the core-derived strength values and the surface-derived strength values are shown in relation to the orientation angle axis 1202 in degrees (°) and the compressive stress axis 1204 in MPa and the confining pressure axis 1206 in MPa. The legend 1208 indicates the core-derived strength values (e.g., circles and dashed lines for the respective confining pressure) and the surface-derived strength values (e.g., solid line for the respective confining pressure).

The anisotropic failure criterion of the present techniques has several distinct enhancements over the conventional approaches. The automated surface fitting procedure tends to minimize variability in measured strength not related to experimental variables ($\sigma_3$ and $\beta$), but rather the result of between-sample material inhomogeneity. Further, the functional minimum in cohesive strength versus orientation at $\beta_{min}$ as shown in FIG. 10 is derived statistically. Moreover, only four empirical constants (A, B, C and $\bar{\phi}$) are utilized to fully quantify shear strength anisotropy.

In block 506, the database fine-grained rock formations are used to develop empirical relationships between the anisotropy parameters describing the 3D failure criterion for each formation and their equivalent bulk strength properties. In this manner, the bulk strength properties refer generally to those properties associated with trans-laminar failure in which failure occurs within the bulk material by cutting across the planes of weakness, and specifically to those properties describing bulk failure at $\beta=0°$ in which the direction of maximum applied compressive stress $\sigma_1$ is coincident with the normal to the planar layering. This block 506 therefore utilizes the mechanical properties database to generate predictive algorithms that statistically relate the empirical constants A, B, C and $\bar{\phi}$ describing the polynomial VCS anisotropic failure criterion, to the equivalent bulk strength properties $\sigma_0|_{\beta=0}$ and $\phi|_{\beta=0}$. An example preferred embodiment for generating such predictive algorithms is detailed below, however, it is apparent that different specific mathematical functions may be used to the same effect.

Figure 13:
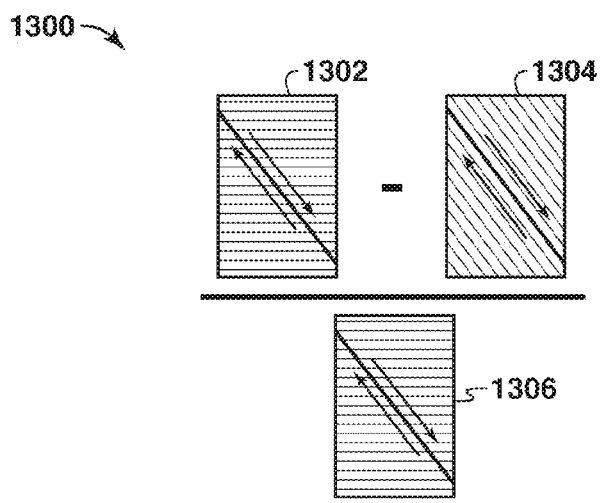
FIG. 13 is a schematic representation of cohesive strength reduction factor (CSR).

To quantify the magnitude of strength anisotropy, a cohesive strength reduction factor (CSR) representing the normalized strength difference associated with shearing across (trans-laminar) versus shear within (intra-laminar) the plane of anisotropy is calculated. FIG. 13 is a schematic representation 1300 of the cohesive strength reduction factor (CSR). In representation 1300, CSR is equal to the difference between trans-laminar cohesive strength at orientation angle $\beta=0°$ (as represented by block 1302) and intra-laminar cohesive strength at orientation angle $\beta_{min}$ (as represented by block 1304) divided by the trans-laminar cohesive strength at orientation angle $\beta=0°$ (as represented by block 1306).

This factor may be represented by Equation (21):

$$CSR = \frac{\left(\tau_0|_{\beta=0}^{core} - \tau_0|_{\beta=\beta min}^{model}\right)}{\tau_0|_{\beta=0}^{core}} = 1 - \left(\frac{\tau_0|_{\beta=\beta min}^{model}}{\tau_0|_{\beta=0}^{core}}\right) \quad \text{Equation (21)}$$

such that, as noted in Equation (22):

$$\tau_0|_{\beta=\beta_{min}}{}^{model} = \tau_0|_{\beta=0}{}^{core} \cdot (1-CSR) \quad \text{Equation (22)}$$

For CSR as defined in Equation (21) trans-laminar strength can be derived from conventional triaxial compression testing ($\beta=0°$) with loading perpendicular to bedding) whereas intra-laminar strength is derived from the modeled functional minimum at $\beta_{min}$ as shown in FIG. 10 and associated with the automated 3D-surface fitting procedure. Intra-laminar and trans-laminar cohesive strengths are therefore simply related through CSR as given in Equation (22). CSR magnitude ranges from zero (implying trans-laminar equal to intra-laminar strength, the isotropic case) to unity (implying zero intra-laminar strength).

Figure 14:
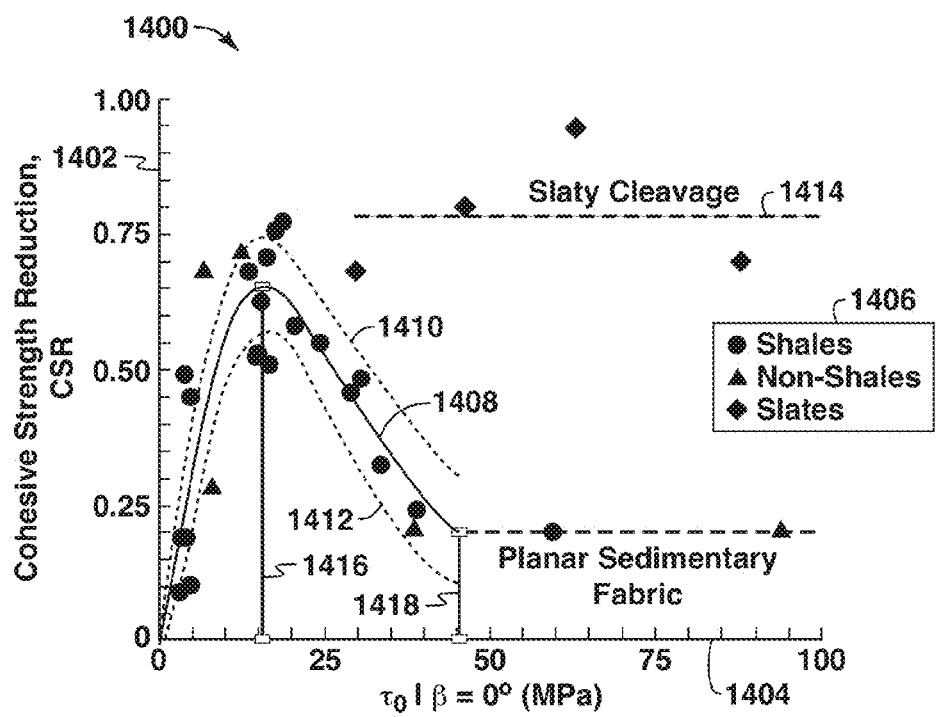
FIG. 14 is a graph of an exemplary graphical technique for deriving CSR from bulk cohesion (either directly measured through conventional triaxial testing or predicted from geophysical wireline logs).

FIG. 14 is a graph 1400 of an exemplary graphical technique for deriving CSR from bulk cohesion at $\beta=0°$ ($\tau_0|_{\beta=0}$ either directly measured through conventional triaxial testing or predicted from geophysical wireline logs). In FIG. 14 CSR magnitude is plotted as a function of core-derived $\tau_0|_{\beta=0}$ for all thirty database formations. In this graph 1400, the CSR values are shown in relation to the CSR axis 1402 (dimensionless) and the bulk cohesive strength axis 1404 in MPa. The legend 1406 indicates that shales are represented by circles, non-shales are represented by triangles and slates are represented by diamonds. The solid line 1408 represents a mean statistical fit to the observed CSR versus bulk cohesive strength data associated with planar sedimentary fabrics, the dotted line 1410 represents an upper bound to the statistical fit (e.g., +95% CL), and the dotted line 1412 represents a lower bound to the statistical fit (e.g., −95% CL). The dashed line 1414 represents an average CSR value associated with slaty cleavage, the line 1416 represents a maximum in the mean statistical fit associated with planar sedimentary fabrics, and the line 1418 represents the transition from the mean statistical fit to a constant average value for all planar sedimentary fabrics.

It is apparent that the slates exhibit the greatest CSR values, presumably due to the crystallographic preferred orientation of their constituent platy minerals. However, all other lithologies with planar sedimentary fabrics exhibit a systematic trend that may be fit using an asymmetric peak function for $\tau_0|_{\beta=0} \leq 45$ MPa of the form of Equation (23):

$$y = \frac{4\alpha_0 \alpha_1^{\alpha_2+1} \alpha_2^2}{x^{\alpha_2+1}[\alpha_2 - 1 + (\alpha_1/x)^{\alpha_2}(\alpha_2+1)]^2} \quad \text{Equation (23)}$$

where $x=\tau_0|_{\beta=0}$, $y=CSR$ and $\alpha_0$, $\alpha_1$ and $\alpha_2$ are empirical constants. As $\tau_0|_{\beta=0}$ can be derived from geophysical wireline logs using a variety of predictive techniques (e.g. Chang and Khaksar). FIG. 14 can therefore be used to estimate CSR in subsurface strata of interest without the requirement of orientated core testing.

Figure 15:
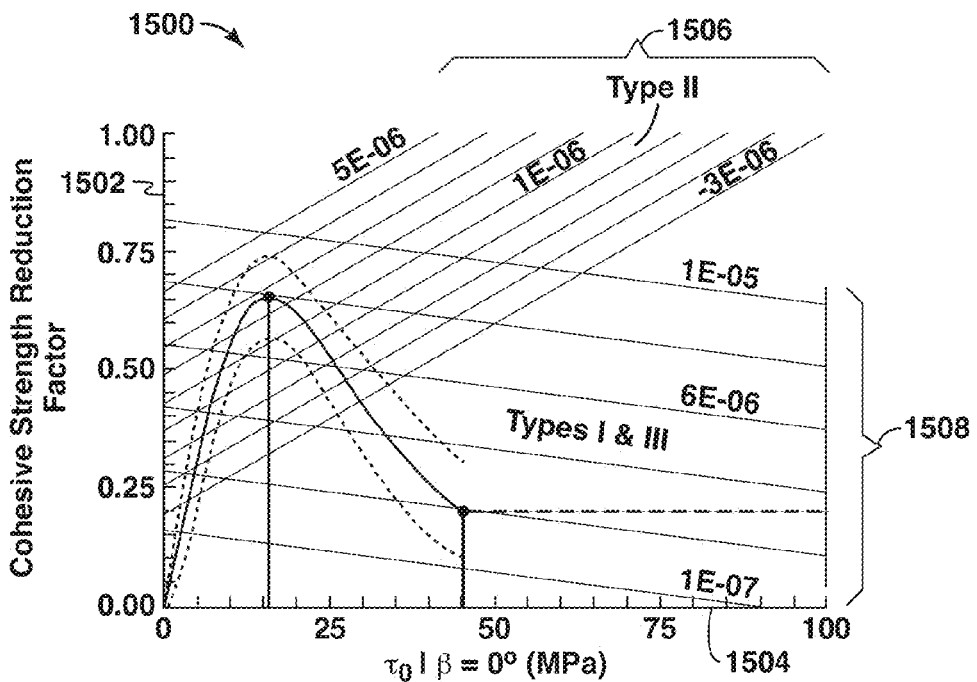
FIG. 15 is a graph of an exemplary nomogram for deriving empirical constants from CSR.

The asymmetric peak function in FIG. 14 exhibits a maximum CSR≈0.65±0.10 at $\tau_0|_{\beta=0}$ of approximately (≈) 15 MPa. The asymmetric peak function qualitatively delineates three distinct regions of strength anisotropy with increasing $\tau_0|_{\beta=0}$ magnitude: weak, relatively isotropic fine-grained lithologies (termed Type I rocks); stronger, relatively anisotropic lithologies (termed Type II rocks); strong, relatively isotropic lithologies (termed Type III rocks). Empirical constants A, B and C describing the anisotropic cohesive strength polynomial function (Equation 18) can be determined from $\tau_0|_{\beta=0}$ and CSR values using the Equation (24):

$$A,B,C = \alpha_3 + \alpha_4(\tau_0|_{\beta=0}) + \alpha_5(CSR) \quad \text{Equation (24)}$$

where $\alpha_3$, $\alpha_4$ and $\alpha_5$ are A, B and C and lithology (Type I, II and III) dependent empirical constants pre-determined through multi-variate regression of the database lithologies. A nomograph (graphical representation of Equation (24)) is shown in FIG. 15 for deriving the appropriate magnitude of empirical constant A, for a given magnitude of $\tau_0|_{\beta=0}$ and CSR. Constants B and C can be similarly derived. FIG. 15 is an exemplary nomogram for deriving empirical constant A from CSR and $\tau_0|_{\beta=0}$. In this graph 1500, the CSR factors are shown in relation to the CSR factor axis 1502 (dimensionless) and the bulk cohesive strength axis 1504 in MPa. The graph 1500 also include various responses, which are referred to collectively as responses 1506, for fine-grained rocks exhibiting Type II anisotropy and various responses, which are referred to collectively as responses 1508, for fine-grained rocks exhibiting Type I and III anisotropy.

Figure 16:
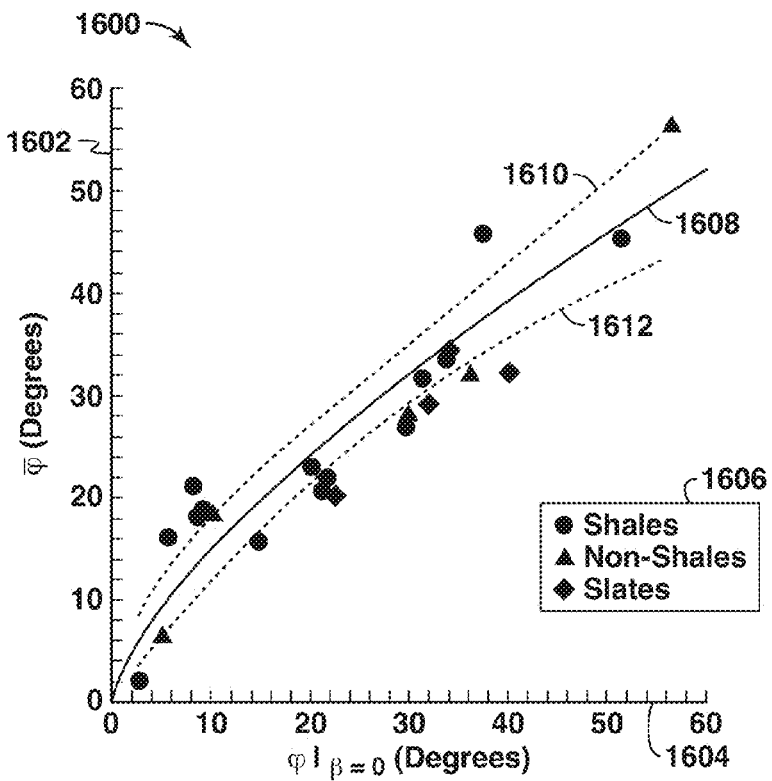
FIG. 16 is a graph of an exemplary graphical technique for estimating mean friction angle $\bar{\phi}$ from bulk friction angle (either directly measured through conventional triaxial testing or predicted from geophysical wireline logs).

For the database lithologies, the mean friction angle, $\bar{\phi}$ exhibits a robust power law relationship with that measured from conventional triaxial compression testing ($\beta=0°$ with loading perpendicular to bedding) as shown in FIG. 16. FIG. 16 is a graph 1600 of an exemplary graphic of estimating mean friction angle $\bar{\phi}$ from bulk friction angle at $\beta=0°$ ($\phi|_{\beta=0}$) either directly measured through conventional triaxial testing or predicted from geophysical wireline logs). In this graph 1600, the estimated mean friction angles are shown in relation to the estimating mean friction angle axis 1602 in degrees and the measured bulk friction angle axis 1604 in degrees. The legend 1606 indicates that shales are represented by circles, non-shales are represented by triangles and slates are represented by diamonds. The solid line 1608 represents a mean statistical fit to the observed mean versus bulk friction angle data, the dotted line 1610 represents an upper bound to the statistical fit (e.g., +95% CL), and the dotted line 1612 represents a lower bound to the statistical fit (e.g., −95% CL).

As $\phi|_{\beta=0}$ can be derived from geophysical wireline logs using a variety of predictive techniques (e.g. Chang and Khaksar), FIG. 16 can therefore be used to estimate $\bar{\phi}$ in subsurface strata of interest without the requirement of orientated core testing.

In block 508, following development of empirical relationships between anisotropy parameters describing the selected 3D failure criterion and the equivalent bulk strength properties as detailed above, an additional step in the predictive workflow involves utilizing the well-known analysis of variance (ANOVA) collection of statistical tools to determine if the predictive algorithms so generated are statistically useful, that is unlikely to have occurred by chance alone. Goodness of fit statistics can be used to quantify discrepancy between observed values and the values expected under the model in question. For example, as a fit becomes better (e.g., as discrepancy between the observed and modeled values is lessened), the coefficient of determination approaches unity, the standard error decreases toward zero and the F-statistic tends towards infinity. If statistical analyses indicate a poor model fit to experimental observations, then the predictive workflow (as shown in FIG. 5) involves modifying the database of experimental observations. Statistical significance may be increased by increasing the number of fine-grained formations included in the database, or by further subdividing the spectrum of database rocks into generic lithotypes displaying common mechanical properties due to shared compositional and textural attributes. Separating database rocks with planar sedimentary fabrics from database rocks with metamorphic foliations as shown in FIG. 14 represents an example of this procedure. Also, lithotyping into Type I, II and III lithologies to enhance statistical significance, as shown in FIG. 15, further illustrates the advantages of this procedure.

Alternatively (or in addition) to adjusting the database of core measurements as detailed above, the anisotropic failure criterion used to quantify orientation-dependent strength variation for all fine-grained rock formations can also be adjusted to increase statistical significance. For example, if ANOVA testing indicates that the predictive algorithms relating the polynomial VCS parameters A, B, C and $\bar{\phi}$ to the equivalent bulk strength properties $\tau_0|_{\beta=0}$ are $\phi|_{\beta=0}$ not statistically significant, then a different anisotropic failure criterion can be fit to all fine-grained formation strength data to generate alternative predictive algorithms relating anisotropy parameters to bulk strength properties.

Figure 17:
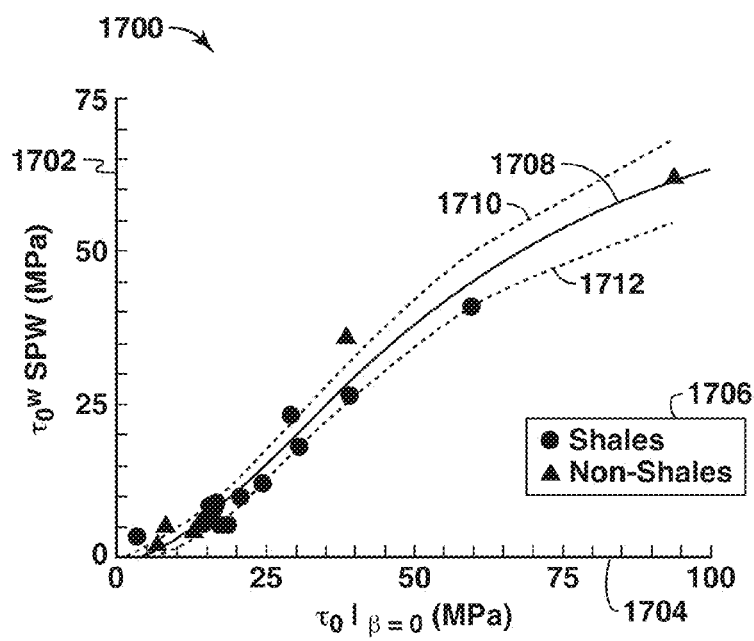
FIG. 17 is a graph for estimating discontinuous single plane of weakness cohesive strength $\tau_0^w$ from bulk cohesion (either directly measured through conventional triaxial testing or predicted from geophysical wireline logs).

For example, the weakness plane cohesive strength, $\tau_0^w$ defined in Equation (1) for the discontinuous SPW model is positively correlated with bulk cohesive strength $\tau_0|_{\beta=0}$ for all fine-grained database rocks with planar sedimentary fabrics. FIG. 17 is a graph 1700 of a method of estimating discontinuous single plane of weakness SPW cohesive strength $\tau_0^w$ from bulk cohesion at $\beta=0°$ ($\tau_0|_{\beta=0}$) either directly measured through conventional triaxial testing or predicted from geophysical wireline logs). In this graph 1700, the estimating discontinuous single plane of weakness SPW cohesive strength $\tau_0^w$ are shown in relation to the estimating discontinuous SPW axis 1702 in MPa and the bulk cohesion axis 1704 in MPa. The legend 1706 indicates that shales are represented by circles and non-shales are represented by triangles. The solid line 1708 represents the mean statistical fit, the dotted line 1710 represents an upper bound to the statistical fit (e.g., +95% CL), and the dotted line 1712 represents a lower bound to the statistical fit (e.g., −95% CL).

Figure 18:
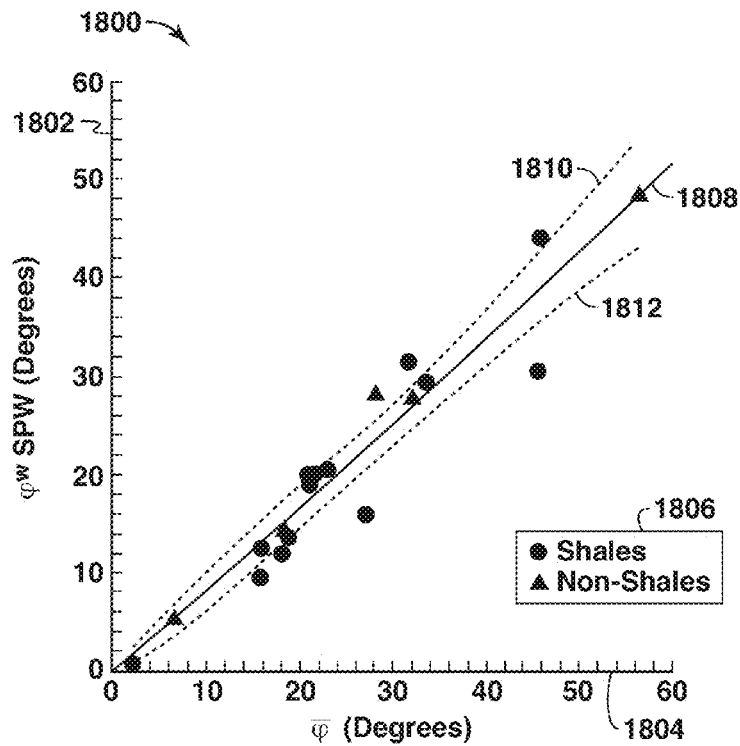
FIG. 18 is a graph of estimating discontinuous single plane of weakness angle of internal friction $\phi^w$ from continuous variable cohesive strength (VCS) mean friction angle $\bar{\phi}$.

In addition, statistically significant correlations between equivalent material parameters from different failure criteria can also be developed for predictive purposes. For example, the weakness plane angle of internal friction $\phi^w$ defined in Equation (1) for the discontinuous SPW model is positively correlated with the mean friction angle, $\bar{\phi}$ defined in Equation (19) for the polynomial VCS model, for all fine-grained database rocks with planar sedimentary fabrics. FIG. 18 is a graph 1800 of an estimating discontinuous single plane of weakness SPW angle of internal friction $\phi w$ from continuous variable cohesive strength VCS mean friction angle $\phi$. In this graph 1800, the estimated discontinuous single plane of weakness SPW angles of internal friction $\phi w$ are shown in relation to the estimated discontinuous SPW angle axis 1802 in degrees and the continuous variable cohesive strength VCS mean friction angle axis 1804 in degrees. The legend 1806 indicates that shales are represented by circles and non-shales are represented by triangles. The solid line 1808 represents the mean statistical fit, the dotted line 1810 represents the upper bound to the statistical fit (e.g., +95% CL), and the dotted line 1812 represents a lower bound to the statistical fit (e.g., −95% CL).

Figures 19A, 19B, 19C:
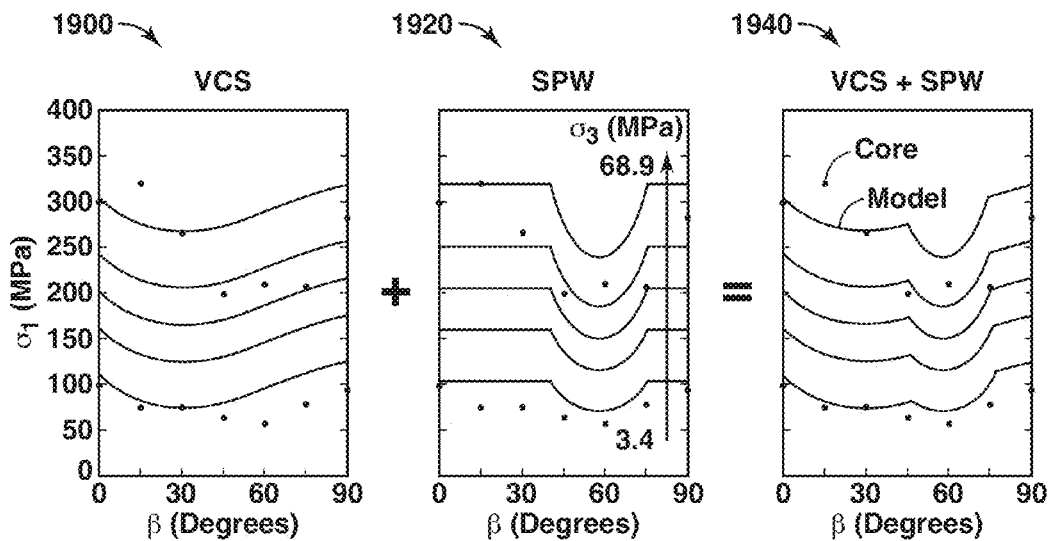
FIGS. 19A to 19C are graphs of combining two anisotropic failure criteria (continuous variable cohesive strength (VCS) and discontinuous single plane of weakness (SPW) models) to provide increased congruency with experimental data.

In yet another embodiment it is evident that, if statistically significant correlations can be generated for predicting the material parameters of more than one anisotropic failure criteria, then these failure criteria can be combined to increase congruency with experimental data. For example, the strength predicted by the continuous VCS model can be combined with the strength predicted by the discontinuous SPW model, where the resultant strength is the lesser of that predicted by the two models. FIG. 19 are exemplary graphs 1900, 1920 and 1940 of combining two anisotropic failure criteria (continuous variable cohesive strength VCS and discontinuous single plane of weakness SPW models) to provide increased congruency with experimental data. Thus different failure criteria may be added together to provide an enhanced fit to the measured data.

Further, in one or more embodiments, the present techniques may be utilized to produce hydrocarbons from a subsurface region. This subsurface region may be represented by a anisotropic rock strength model along an actual or proposed wellbore trajectory, which may be generated in accordance with the techniques noted above. For example, a method may include constructing a subsurface model via one or more of the various embodiments above. Then, the subsurface model may be utilized in hydrocarbon management activities to determine locations of resources, access the resources and produce hydrocarbons in a manner know to those skilled in the art. Disclosed aspects may be used in hydrocarbon management activities. As used herein, "hydrocarbon management" or "managing hydrocarbons" includes hydrocarbon extraction, hydrocarbon production, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$, for example the sequestration of $CO_2$, such as reservoir evaluation, development planning, and reservoir management. In one embodiment, the disclosed methodologies and techniques may be used to extract hydrocarbons from a subsurface region. In such an embodiment, geophysical information is utilized to define an anisotropic rock strength volume. Based at least in part on the anisotropic rock strength volume, hydrocarbon extraction may then be conducted to remove hydrocarbons from the subsurface region, which may be accomplished by drilling a well using oil drilling equipment. The equipment and techniques used to drill a well and/or extract the hydrocarbons are well known by those skilled in the relevant art. Other hydrocarbon extraction activities and, more generally, other hydrocarbon management activities, may be performed according to known principles.

Persons skilled in the technical field will readily recognize that in practical applications of the disclosed methodology, it is partially performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present techniques also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present techniques are in no way limited to implementation in any specific operating system or environment.

As an example, a computer system may be utilized and configured to implement one or more of the present aspects. The computer system may include a plurality of processors; memory in communication with the processors; and a set of instructions stored on the memory and accessible by the processors, wherein the set of instructions, when executed, are configured to: compile a database of core-based strength measurements over a range of orientations and confining pressures for a plurality of fine-grained rock formations; utilize an automated surface fitting procedure to determine a common anisotropic failure criterion for all database rocks; develop predictive algorithms relating anisotropy parameters in failure criterion and equivalent bulk strength properties; generate subsurface bulk strength properties in strata of interest; utilize the predictive algorithms and subsurface bulk strength properties to calculate equivalent anisotropic strength properties in subsurface strata of interest; utilize predicted anisotropic rock strength for subsurface strata of interest in numerical models of the subsurface. In certain embodiments, the set of instructions may perform the different aspects in the methods noted above or the algorithm noted above.

Figure 20:
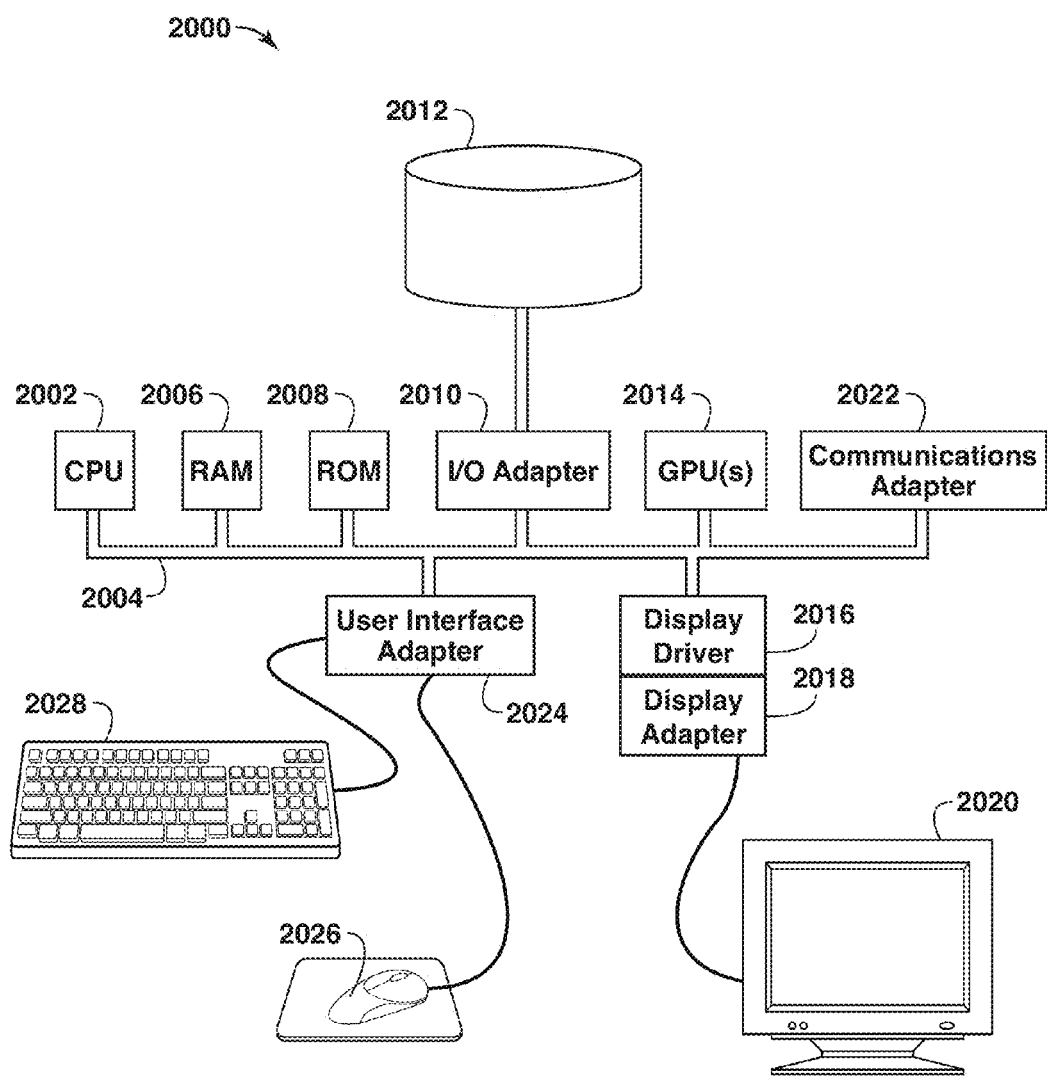
FIG. 20 is a block diagram of an exemplary computing system that may be used in exemplary embodiments of the present techniques.

As an example, the techniques discussed herein may be implemented on a computing device, such as that shown in FIG. 20. FIG. 20 shows an exemplary computer system 2000 on which software for performing processing operations of embodiments of the present techniques may be implemented. A central processing unit (CPU) 2002 is coupled to a system bus 2004. The CPU 2002 may be any general-purpose CPU. The present techniques are not restricted by the architecture of CPU 2002 (or other components of exemplary system 2000) as long as the CPU 2002 (and other components of system 2000) supports operations according to the techniques described herein.

The CPU 2002 may execute the various logical instructions according to the disclosed techniques. For example, the CPU 2002 may execute machine-level instructions for performing processing according to the exemplary operational flow described above. As a specific example, the CPU 2002 may execute machine-level instructions for performing the methods of FIGS. 1 to 6B.

The computer system 2000 may also include random access memory (RAM) 2006, which may be SRAM, DRAM, SDRAM, or the like. The computer system 2000 may include read-only memory (ROM) 2008 which may be PROM, EPROM, EEPROM, or the like. The RAM 2006 and the ROM 2008 hold user and system data and programs, as is well known in the art. The programs may include code stored on the RAM 2006 that may be used for modeling geologic properties with homogenized mixed finite elements, in accordance with embodiments of the present techniques.

The computer system 2000 may also include an input/output (I/O) adapter 2010, a communications adapter 2022, a user interface adapter 2024, and a display adapter 2018. The I/O adapter 2010, user interface adapter 2024, and/or communications adapter 2022 may, in certain embodiments, enable a user to interact with computer system 2000 to input information. Further, the computer system 2000 may also include a graphical processing unit (GPU(s)) to enhance the graphical processing of the computer system 2000.

The I/O adapter 2010 may connect the bus 2004 to storage device(s) 2012, such as one or more of hard drive, compact disc (CD) drive, floppy disk drive, tape drive, flash drives, USB connected storage, etc. to computer system 2000. The storage devices may be used when RAM 2006 is insufficient for the memory requirements associated with storing data for operations of embodiments of the present techniques. For example, the storage device 2012 of computer system 2000 may be used for storing such information as computational meshes, intermediate results and combined data sets, and/or other data used or generated in accordance with embodiments of the present techniques.

The communications adapter 2022 is adapted to couple the computer system 2000 to a network (not shown), which may enable information to be input to and/or output from the system 2000 via the network, for example, the Internet or other wide-area network, a local-area network, a public or private switched telephone network, a wireless network, or any combination of the foregoing. The user interface adapter 2024 couples user input devices, such as a keyboard 2028, a pointing device 2026, and a microphone (not shown) and/or output devices, such as speaker(s) (not shown) to computer system 2000. The display driver 2016 and display adapter 2018 are driven by the CPU 2002 to control the display on the display device 2020, for example, to display information pertaining to a target area under analysis, such as displaying a generated representation of the computational mesh, the reservoir, or the target area, according to certain embodiments.

The present techniques are not limited to the architecture of the computer system 2000 shown in FIG. 20. For example, any suitable processor-based device may be utilized for implementing all or a portion of embodiments of the present techniques, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments. In one embodiment of the present techniques, the computer system may be a networked multi-processor system.

One or more of the following embodiments in the following paragraphs may be utilized with the processes, apparatus, and systems, provided above, to prepare a model and/or be utilized to produce hydrocarbons:

A1. A method for predicting strength anisotropy in subsurface formations along a wellpath comprising: receiving a stress model of the subsurface formation in the area of the wellpath; obtaining bulk strength properties of target rock; developing anisotropic failure criteria based on the bulk strength properties; combining the stress model with the anisotropic failure criteria to develop an anisotropic wellbore stability model; and using the anisotropic wellbore stability model to enhance hydrocarbon recovery.

A2. The method of paragraph A1, the obtaining bulk strength of target rock is determined from the analysis of well logs.

A3. The method of paragraph A1 or A2, wherein the enhance hydrocarbon recovery comprises using the determined anisotropic failure criteria to model wellbore stability along the wellpath.

A4. The method recited in any of paragraphs A1 to A3, wherein determining the anisotropic failure criteria is determined without coring the subsurface strata of interest for the target rock and without performing laboratory strength measurements of the target rock.

A5. The method recited in any of paragraphs A1 to A4, wherein the developing anisotropic failure criteria based on the bulk strength properties comprises using a pre-established database of strength measurements derived from orientated core testing to develop predictive algorithms relating parameters describing the degree of strength anisotropy associated with diverse geologic planes of weakness to bulk strength properties.

B1. A method for predicting strength anisotropy in subsurface formations comprising: compiling a database of core-based strength measurements over a range of orientations and confining pressures for a plurality of fine-grained rock formations; utilizing an automated surface fitting procedure to determine a common anisotropic failure criterion for all database rocks; developing predictive algorithms relating anisotropy parameters in failure criterion and equivalent bulk strength properties; generating subsurface bulk strength properties in strata of interest; utilizing the predictive algorithms and subsurface bulk strength properties to calculate equivalent anisotropic strength properties in subsurface strata of interest; utilizing predicted anisotropic rock strength for subsurface strata of interest in numerical models of the subsurface.

B2. The method of paragraph B1 further comprising: determining observed anisotropic strength values based on the database of core-based strength measurements; determining predicted strength values based on the predictive algorithms; and using statistical tools to evaluate a goodness of fit between the observed anisotropic strength values and the predicted strength values.

B3. The method of paragraph B2 further comprising modifying the predictive algorithms based on the goodness of fit.

B4. The method of any one of paragraphs B3 to B4 further comprising modifying the database of core-based strength measurements based on the goodness of fit.

C1. A system associated with the drilling of a wellbore comprising: a processor; memory coupled to the processor; an application stored in the memory and configured to: compile a database of core-based strength measurements over a range of orientations and confining pressures for a plurality of fine-grained rock formations; utilize an automated surface fitting procedure to determine a common anisotropic failure criterion for all database rocks; develop predictive algorithms relating anisotropy parameters in failure criterion and equivalent bulk strength properties; generate subsurface bulk strength properties in strata of interest; utilize the predictive algorithms and subsurface bulk strength properties to calculate equivalent anisotropic strength properties in subsurface strata of interest; utilize predicted anisotropic rock strength for subsurface strata of interest in numerical models of the subsurface to develop an anisotropic wellbore stability model; and a monitor coupled to the processor and configured to present aspects of the anisotropic wellbore stability model.

C2. The system of paragraph C1 wherein the application is further configured to: determine observed anisotropic strength values based on the database of core-based strength measurements; determine predicted strength values based on the predictive algorithms; and use statistical tools to evaluate a goodness of fit between the observed anisotropic strength values and the predicted strength values.

C3. The system of paragraph C2 wherein the application is further configured to modify the predictive algorithms based on the goodness of fit.

C4. The system of paragraph C2 or C3 wherein the application is further configured to modify the database of core-based strength measurements based on the goodness of fit.

D1. A method for predicting strength anisotropy in subsurface formations along a wellpath comprising: obtaining relationships between planes of weakness and bulk material strength for a plurality of rock samples; obtaining bulk strength of target rock (e.g., well logs, pre-established techniques, etc.); calculating the planes of weakness for the target rock (strength anisotropy); and using the results to enhance models, which may be used for wellbore stability analysis and/or enhancing recovery.

E1. A method for predicting strength anisotropy in subsurface formations along a wellpath comprising: compiling a database of orientated triaxially compressive strength measurements for a plurality of fine-grained rock formations; utilizing an automated surface fitting procedure to generate a common 3D anisotropic failure criterion for each fine-grained rock formation; developing predictive algorithms relating the anisotropic strength parameters describing the 3D anisotropic failure criterion for each fine-grained rock formation and their equivalent bulk strength properties; statistical tools may be utilized to evaluate the goodness of fit between the observed and predicted strength values; in the event the statistical tool determines that no good fit is shown, the database of rock measurements and/or the predictive algorithm may be adjusted; in the event the statistical tool determines that a good fit is established, the process continues by generating bulk strength properties in the subsurface strata of interest using a variety of established petrophysical techniques; utilizing the predictive algorithms pre-established from the database and the bulk strength properties in the subsurface strata of interest to determine the equivalent anisotropic strength properties in the subsurface strata of interest; utilizing the predicted anisotropic rock strength properties of the subsurface strata of interest in numerical models of the subsurface, including analytical and computational methods for optimizing mud weight design in ERD wells.

F1. The method of any one of paragraph A1 to A5, B1 to B4, D1 or E1, wherein one or more of the steps are stored as instructions in memory and are executed by the processor accessing the memory to execute the instructions.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

What is claimed is:

1. A method for predicting strength anisotropy in subsurface formations along a wellpath comprising:
   receiving a stress model of the subsurface formation in the area of the wellpath;
   obtaining bulk strength properties of target rock, wherein the bulk strength properties are determined without coring the subsurface strata of interest for the target rock and without performing laboratory strength measurements of the target rock;
   developing anisotropic failure criteria based on the bulk strength properties, wherein the anisotropic failure criteria are developed using predictive algorithms that relate strength measurements derived from orientated core testing of samples not from the subsurface strata of interest and the degree of strength anisotropy associated with diverse geologic planes of weakness;
   combining the stress model with the anisotropic failure criteria to develop an anisotropic wellbore stability model which calculates planes of weakness for the target rock; and
   using the anisotropic wellbore stability model to enhance hydrocarbon recovery.

2. The method of claim 1, the obtaining bulk strength of target rock is determined from the analysis of well logs.

3. The method of claim 1, wherein the enhance hydrocarbon recovery comprises using the determined anisotropic failure criteria to model wellbore stability along the wellpath.

4. A method for predicting strength anisotropy in subsurface formations comprising:
   compiling a database of core-based strength measurements over a range of orientations and confining pressures for a plurality of fine-grained rock formations;
   utilizing an automated surface fitting procedure to determine a common anisotropic failure criterion for all database rocks, wherein the anisotropic failure criterion is based on the core-based strength measurements and geologic planes of weakness;
   developing predictive algorithms relating anisotropy parameters in failure criterion and equivalent bulk strength properties;
   generating subsurface bulk strength properties in strata of interest;
   utilizing the predictive algorithms and subsurface bulk strength properties to calculate equivalent anisotropic strength properties along planes of weakness in subsurface strata of interest; and
   utilizing predicted anisotropic rock strength for subsurface strata of interest in numerical models of the subsurface.

5. The method of claim 4 further comprising:
   determining observed anisotropic strength values based on the database of core-based strength measurements;
   determining predicted strength values based on the predictive algorithms; and
   using statistical tools to evaluate a goodness of fit between the observed anisotropic strength values and the predicted strength values.

6. The method of claim 5 further comprising modifying the predictive algorithms based on the goodness of fit.

7. The method of claim 5 further comprising modifying the database of core-based strength measurements based on the goodness of fit.

8. A system associated with the drilling of a wellbore comprising:
   a processor;
   memory coupled to the processor;
   an application stored in the memory and, when executed, configured to:
   compile a database of core-based strength measurements over a range of orientations and confining pressures for a plurality of fine-grained rock formations;
   utilize an automated surface fitting procedure to determine a common anisotropic failure criterion for all database rocks, wherein the anisotropic failure criterion is based on the core-based strength measurements and geologic planes of weakness;
   develop predictive algorithms relating anisotropy parameters in failure criterion and equivalent bulk strength properties;
   generate subsurface bulk strength properties in strata of interest;
   utilize the predictive algorithms and subsurface bulk strength properties to calculate equivalent anisotropic strength properties along planes of weakness in subsurface strata of interest; and
   utilize predicted anisotropic rock strength for subsurface strata of interest in numerical models of the subsurface to develop an anisotropic wellbore stability model; and
   a monitor coupled to the processor and configured to present aspects of the anisotropic wellbore stability model.

9. The system of claim 8 wherein the application is further configured to:
   determine observed anisotropic strength values based on the database of core-based strength measurements;
   determine predicted strength values based on the predictive algorithms; and
   use statistical tools to evaluate a goodness of fit between the observed anisotropic strength values and the predicted strength values.

10. The system of claim 9 wherein the application is further configured to modify the predictive algorithms based on the goodness of fit.

11. The system of claim 9 wherein the application is further configured to modify the database of core-based strength measurements based on the goodness of fit.

* * * * *